United States Patent
Beyda et al.

(10) Patent No.: US 10,473,887 B2
(45) Date of Patent: Nov. 12, 2019

(54) HEATED SHAVING MIRROR

(71) Applicant: TOWN & COUNTRY LINEN CORP., New York, NY (US)

(72) Inventors: Jeffrey Beyda, New York, NY (US); Robert Passaretti, New York, NY (US); Gina Barnaba, New York, NY (US)

(73) Assignee: TOWN & COUNTRY LINEN CORP., New York, NY (US)

(*) Notice: Subject to any disclaimer, the term of this patent is extended or adjusted under 35 U.S.C. 154(b) by 92 days.

(21) Appl. No.: 15/699,630

(22) Filed: Sep. 8, 2017

(65) Prior Publication Data
US 2019/0079264 A1  Mar. 14, 2019

(51) Int. Cl.
| | |
|---|---|
| G02B 7/18 | (2006.01) |
| H05B 3/84 | (2006.01) |
| A45D 42/16 | (2006.01) |
| A45D 42/14 | (2006.01) |
| A45D 42/08 | (2006.01) |

(52) U.S. Cl.
CPC ......... *G02B 7/1815* (2013.01); *A45D 42/08* (2013.01); *A45D 42/14* (2013.01); *A45D 42/16* (2013.01); *H05B 3/845* (2013.01)

(58) Field of Classification Search
None
See application file for complete search history.

(56) References Cited

U.S. PATENT DOCUMENTS

| | | | |
|---|---|---|---|
| 6,420,682 B1 | 7/2002 | Sellgren et al. | |
| 7,131,739 B2 | 11/2006 | Sellgren et al. | |
| 9,470,890 B2 | 10/2016 | Mills | |
| 2004/0257656 A1* | 12/2004 | Sellgren ........... | H05B 3/845 359/512 |

FOREIGN PATENT DOCUMENTS

WO  WO 01/73483  10/2001

* cited by examiner

*Primary Examiner* — Jennifer D. Carruth
(74) *Attorney, Agent, or Firm* — Leason Ellis LLP

(57) ABSTRACT

A portable heated mirror includes a mount subassembly that includes a mount housing and a mount member that is configured to releasably attach the heated mirror to a support surface. The heated mirror also includes a mirror subassembly that is pivotally attached to the mount subassembly by a ball-in-socket arrangement. The mirror subassembly includes a mirror housing that contains a mirror and a flexible heating element in the form of a flexible heat film that contains heating elements and is secured to a rear surface of the mirror for heating the mirror when the flexible heat film is actuated. A battery power source is operatively connected to a printed circuit board that is contained within the mirror housing.

23 Claims, 28 Drawing Sheets

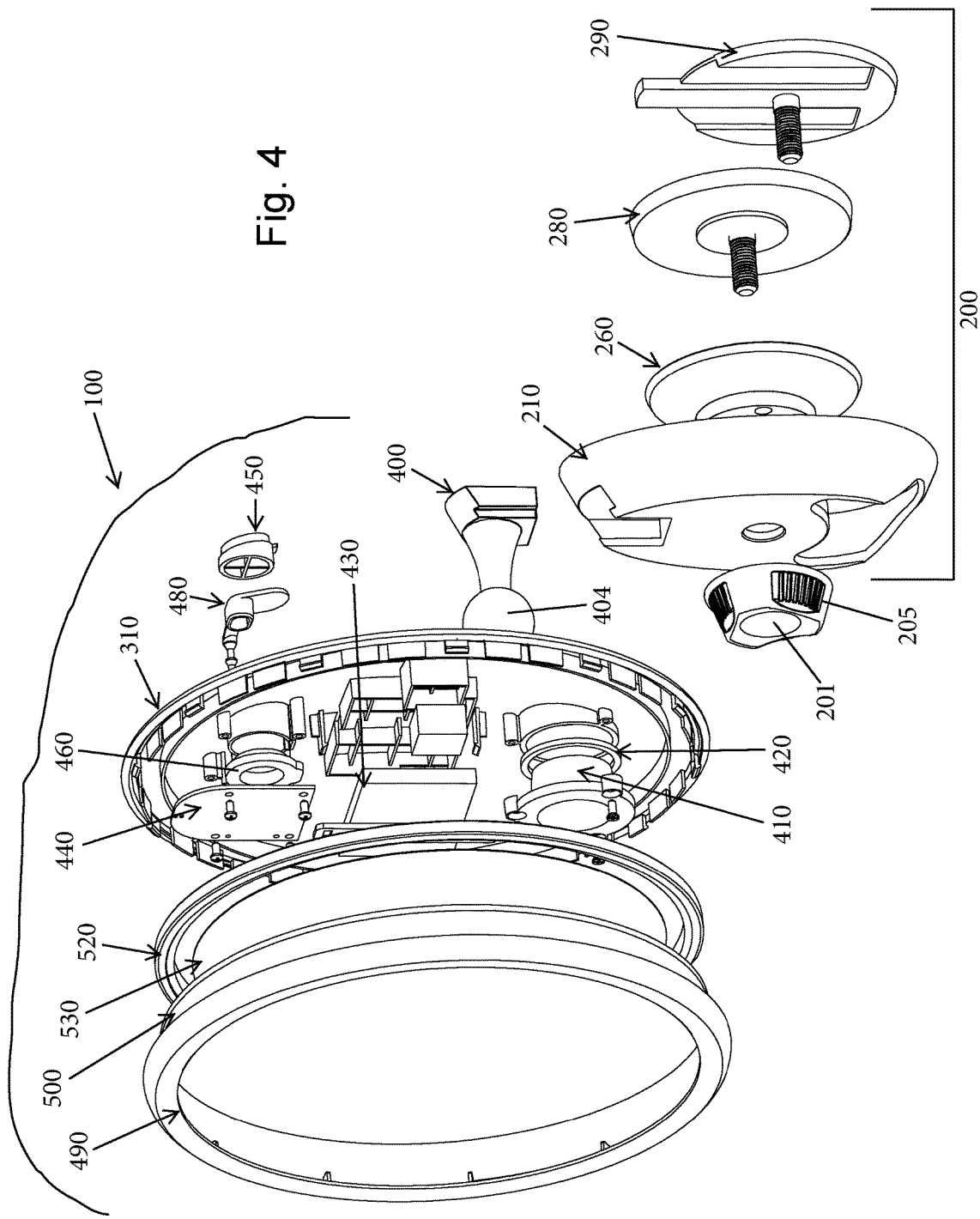

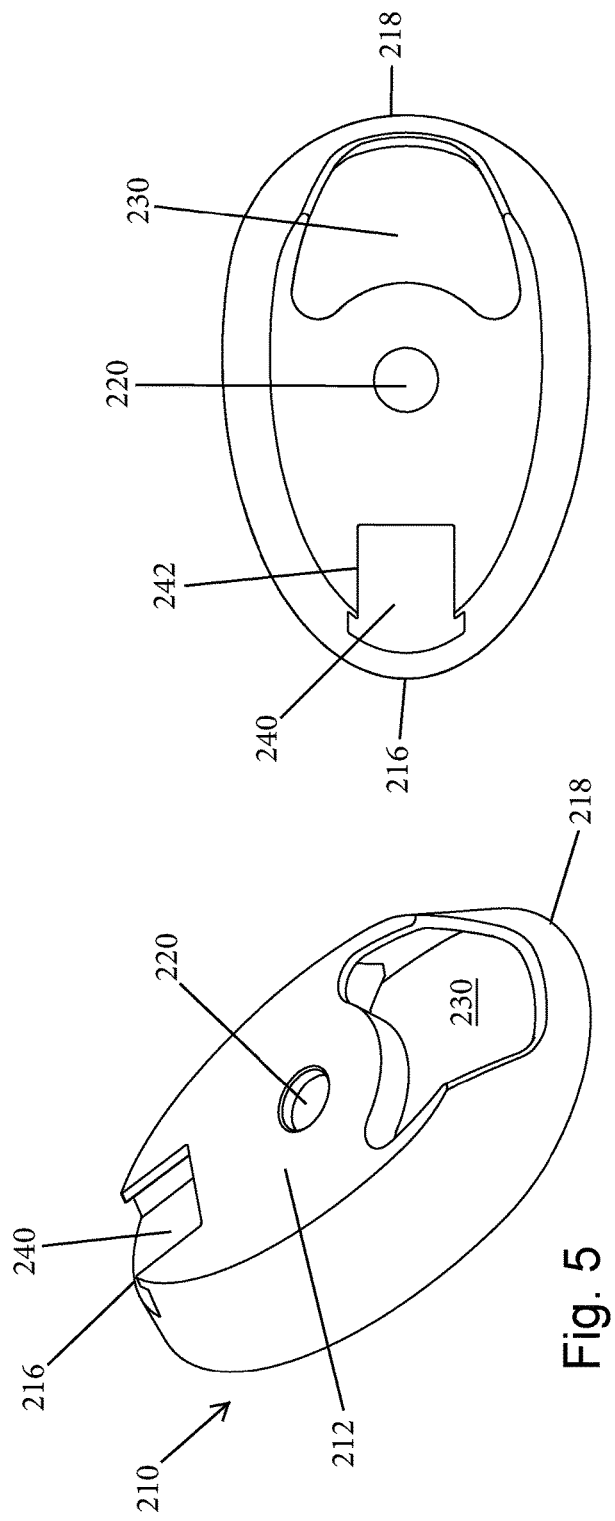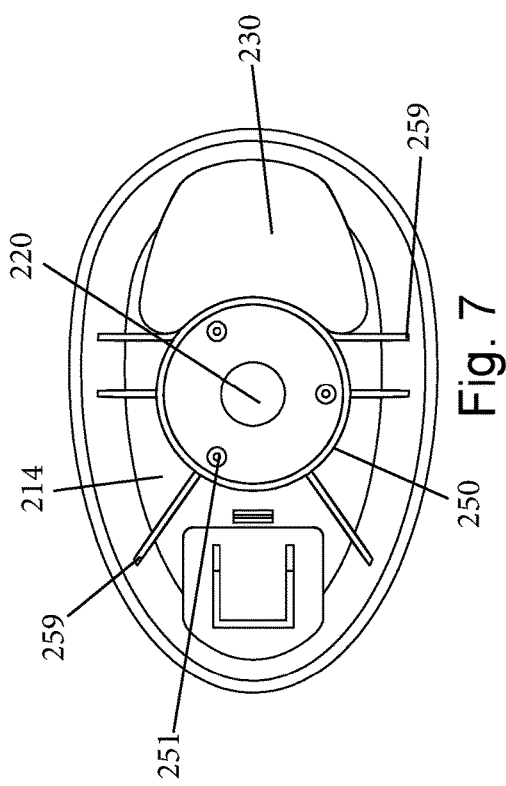

Figure 3:
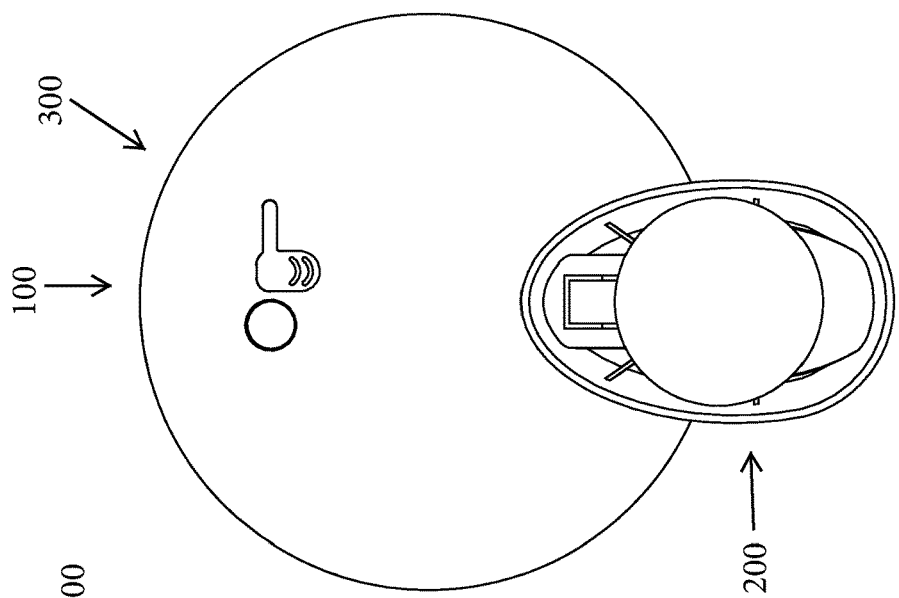

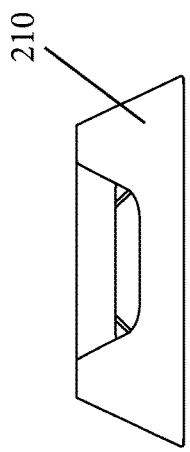
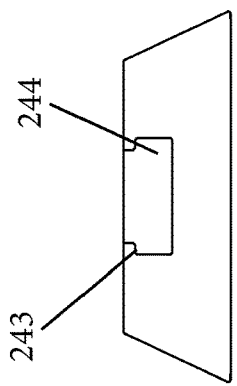
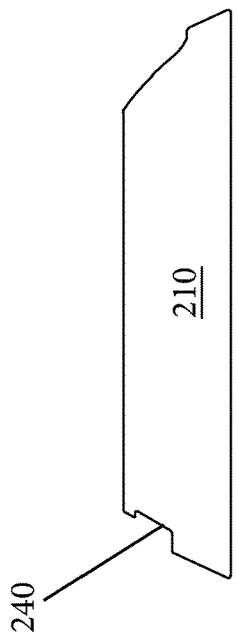
Fig. 10
Fig. 9
Fig. 8

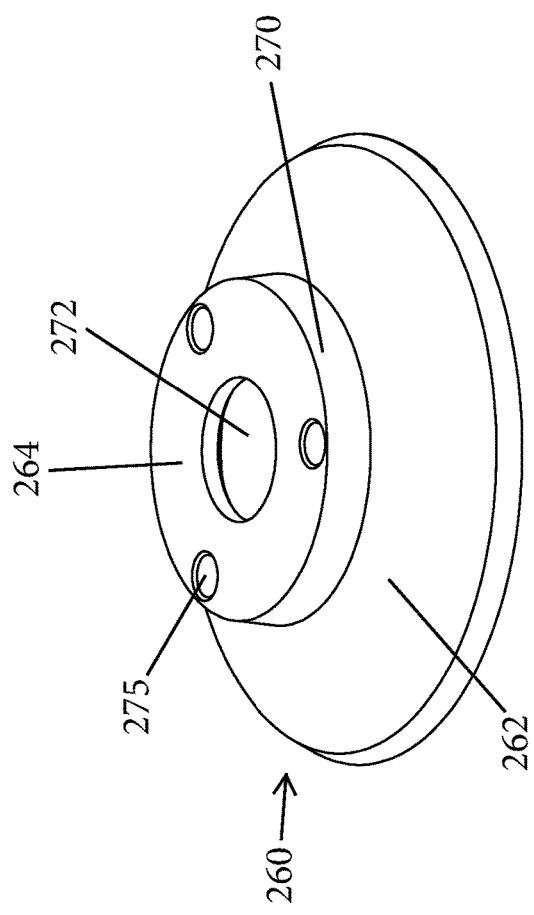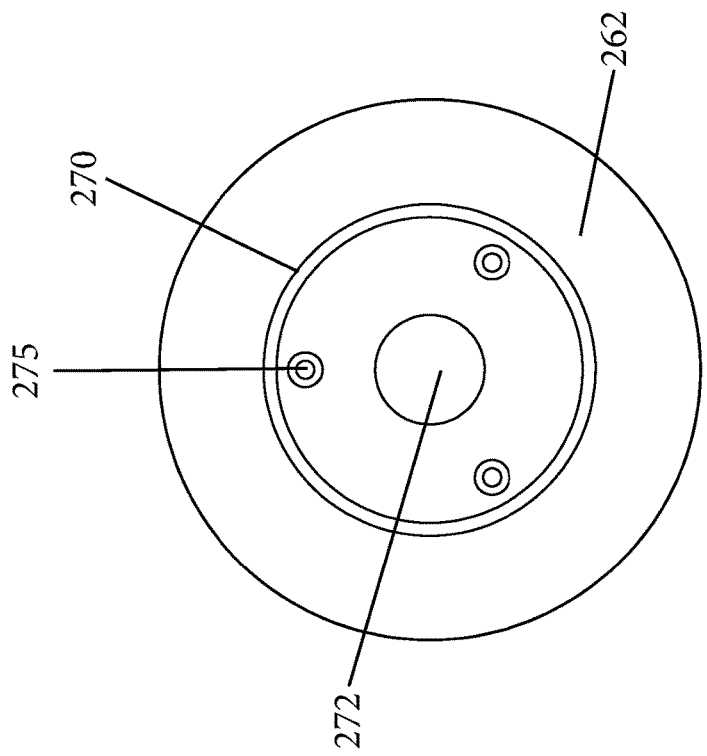
Fig. 11
Fig. 12

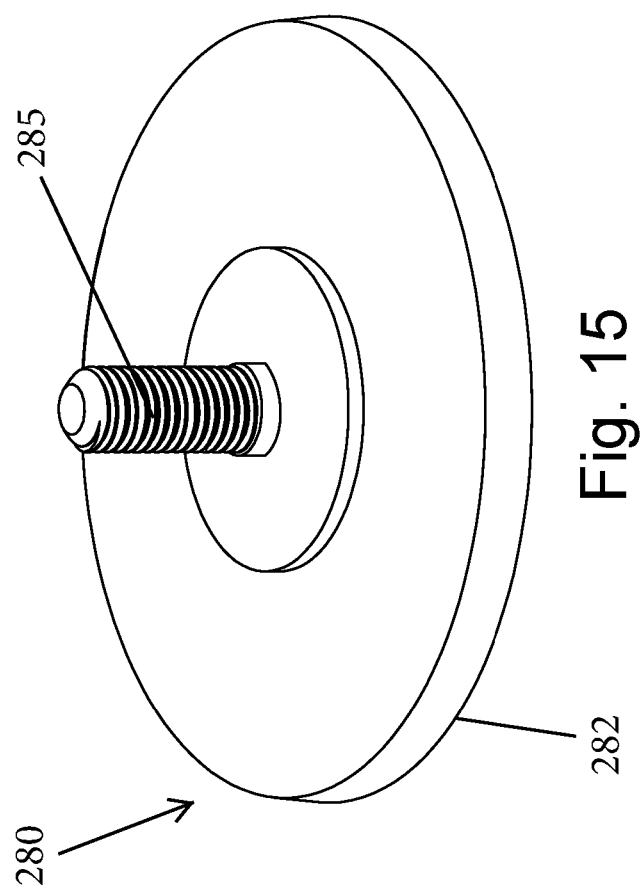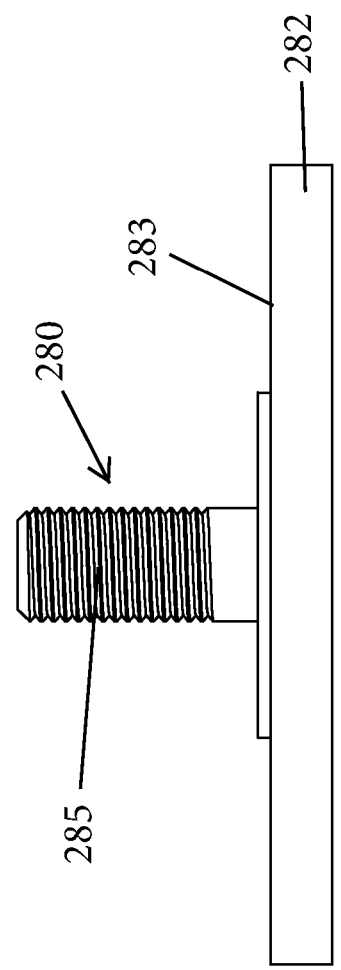

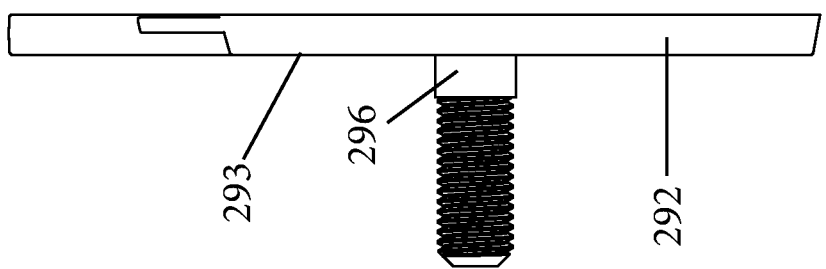
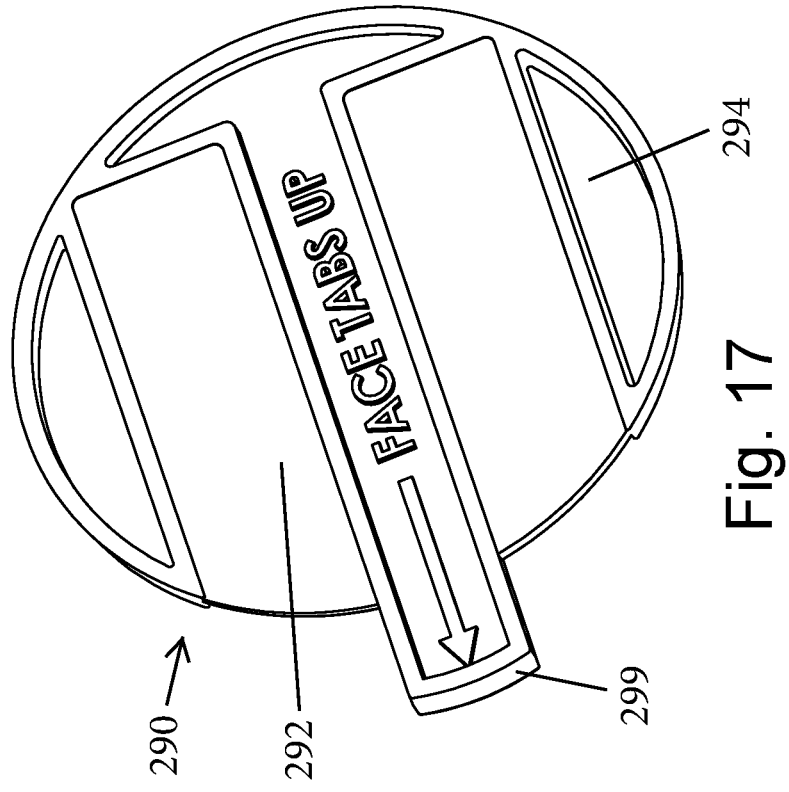

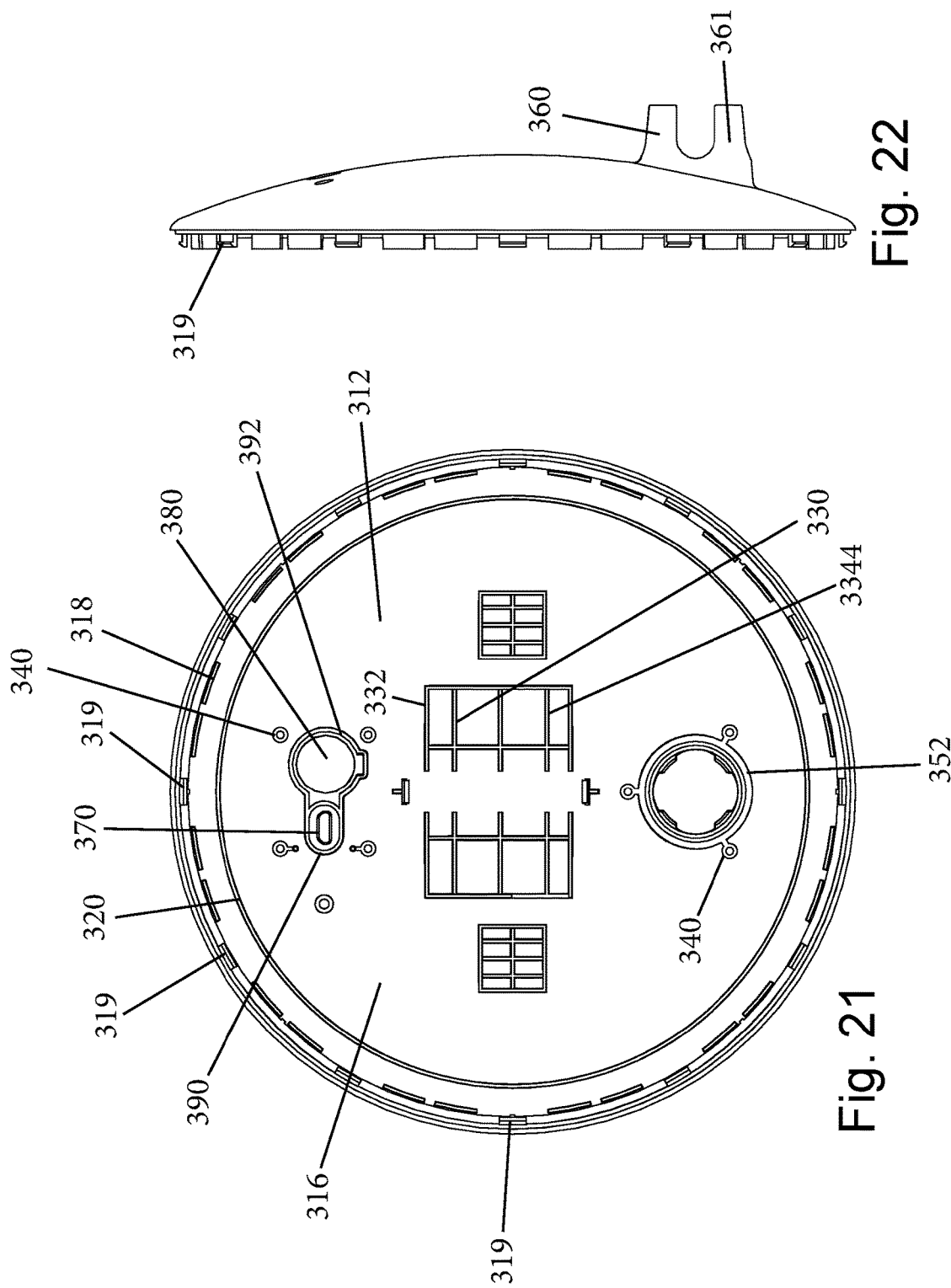

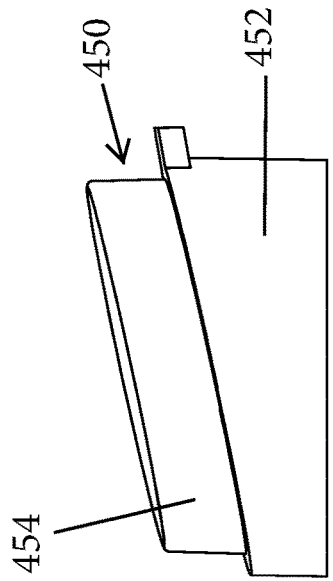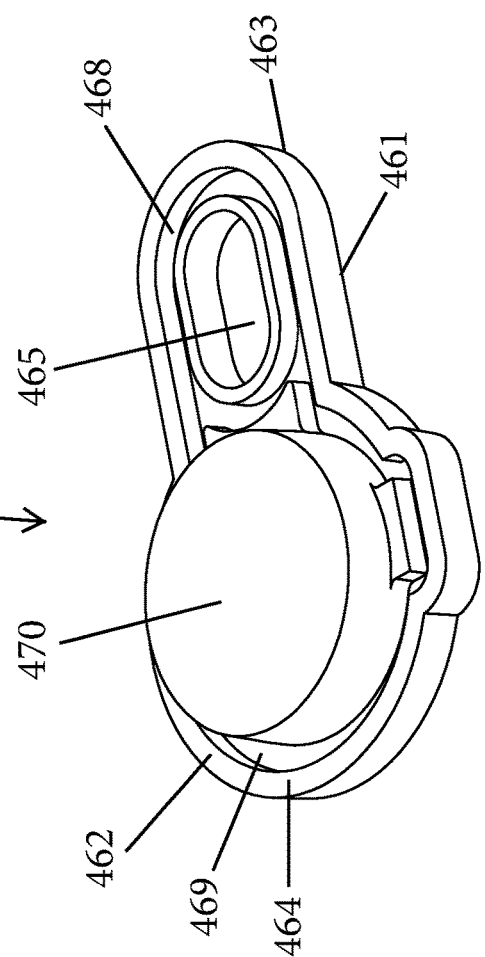

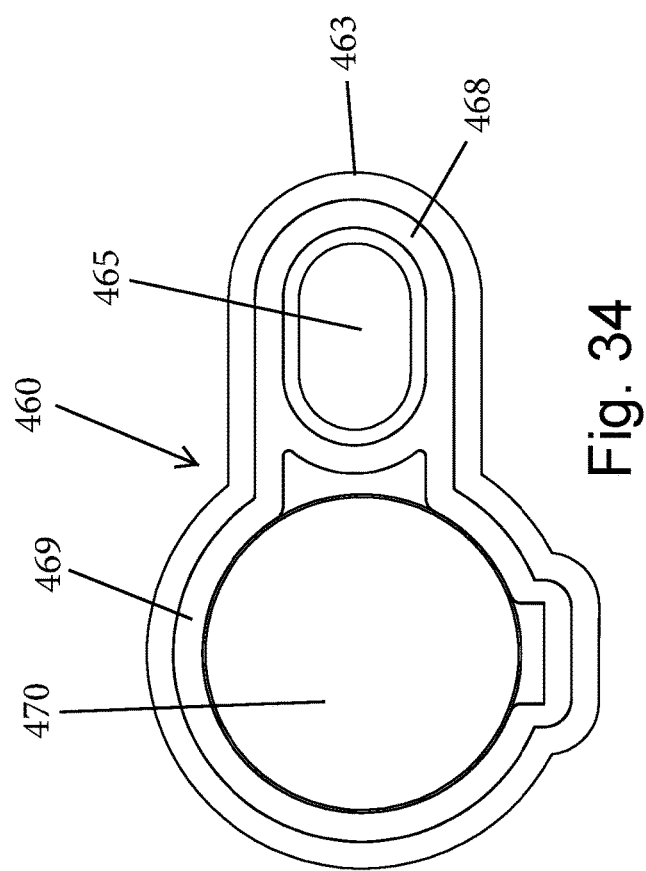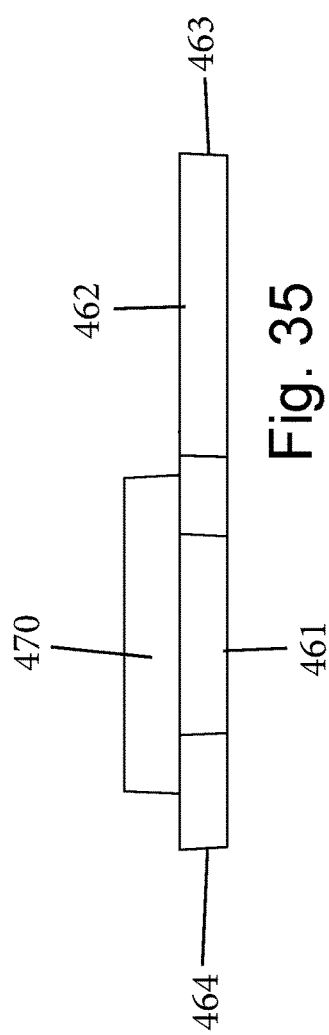

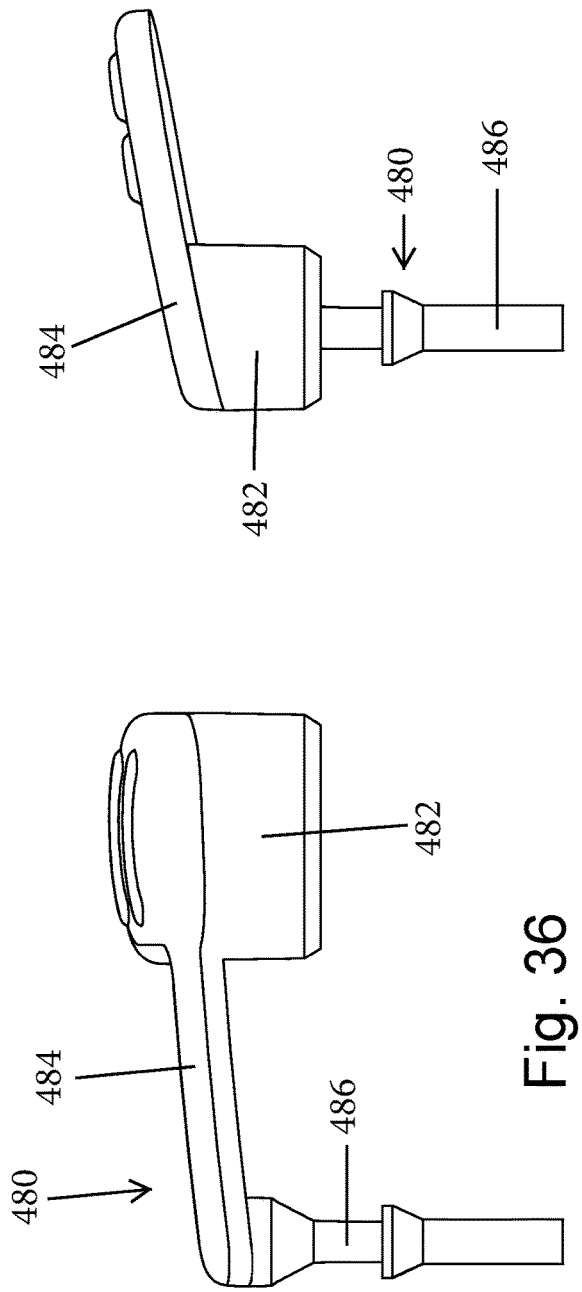

US 10,473,887 B2

HEATED SHAVING MIRROR

TECHNICAL FIELD

The present invention relates to consumer shaving accessories and more particularly, relates to a fogless shaving mirror that is constructed for use in a shower itself.

BACKGROUND

In terms of personal grooming, shaving is a task that is routinely performed by both men and women. While there is a wide assortment of consumer products to aid a razor in performing a clean, comfortable cut, the environmental conditions also influence the shaving process. For example, warm, hydrated skin is much preferred to cold, dry skin and therefore, many individuals shave while in the tub or shower since taking a shower or taking a bath heats the skin and also adds moisture to the air. Most individuals shave in the bathroom and many shave either after or during a shower or bath and most people use a mirror during the shaving process so that the shaver can see his/her skin and the hair to be removed. Unfortunately, as is well known, when mirrors are used in warm temperatures with a high degree of humidity, mirrors quickly develop a layer of condensation on the mirror surface. In other words, the mirror easily "fogs" up. These are precisely, the environmental conditions found in a bathroom.

As is known, in the field of mirrors, application of heat to the mirror surface aids is reducing the amount of condensation on the mirror surface. Thus, different products have been commercialized as being "fogless mirrors" for use in the bathroom; however, these products are most often of a type that is directly connected into an electrical outlet. Electricity is used to power a heating element for heating the mirror surface and sometimes, also to power a light associated with the mirror. Since these mirrors plug into an electrical wall outlet, the mounting location of the mirror is limited in that the mirrors cannot be located too close to a source of water. Clearly these types of products cannot be used directly in a shower or bath tub where water is present. There is therefore a need for a fogless, heated shaving mirror that is configured for use in a shower or bath tub in that the mirror has an internal power source that is contained in a water-resistant housing.

SUMMARY

A portable heated mirror includes a mount subassembly and a mirror subassembly. The mount subassembly includes a mount housing and a mount member that is configured to releasably attach the heated mirror to a support surface. The mirror subassembly is pivotally attached to the mount subassembly by a ball-in-socket arrangement. The mirror subassembly includes a mirror housing that contains a mirror and a flexible heating element in the form of a flexible heat film that contains heating elements and is secured to a rear surface of the mirror for heating the mirror when the flexible heat film is actuated. The heated mirror also includes a battery power source that is operatively connected to heating element and to a printed circuit board that is contained within the mirror housing.

BRIEF DESCRIPTION OF THE DRAWING FIGURES

Figure 2:
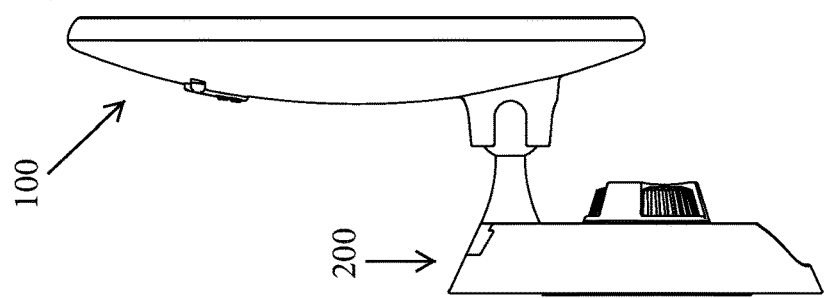
Figure 1:
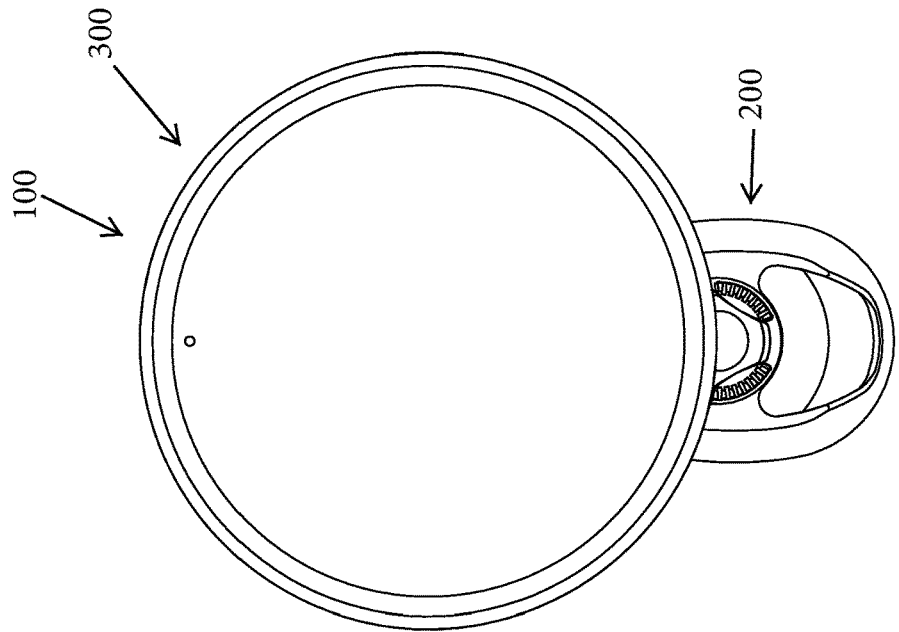
Figure 14:
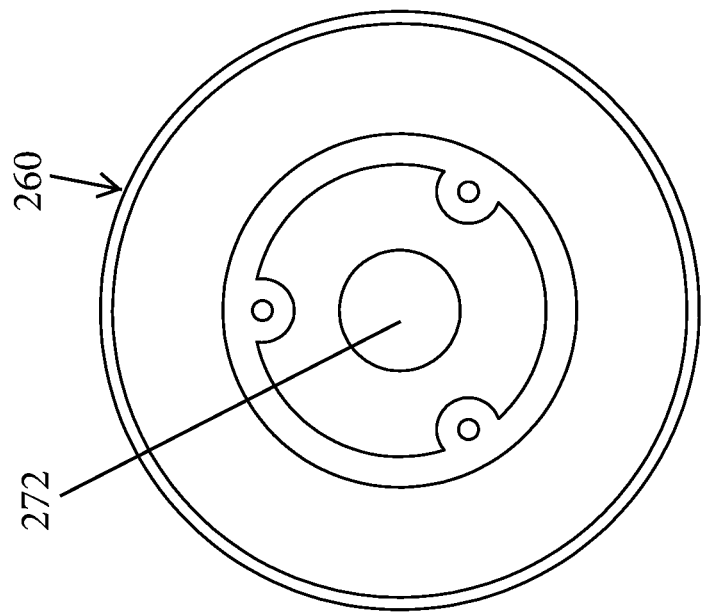
Figure 13:
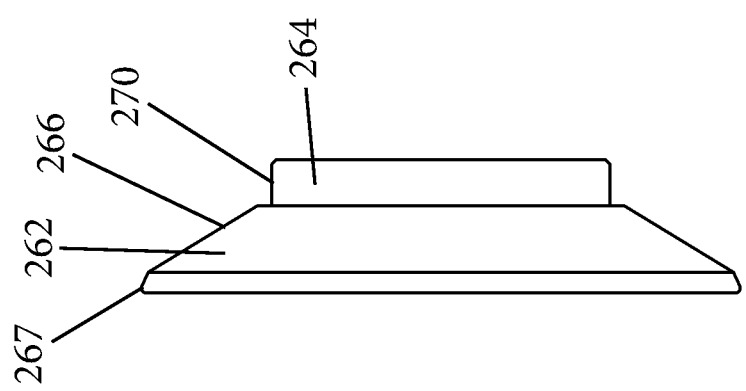
Figure 20:
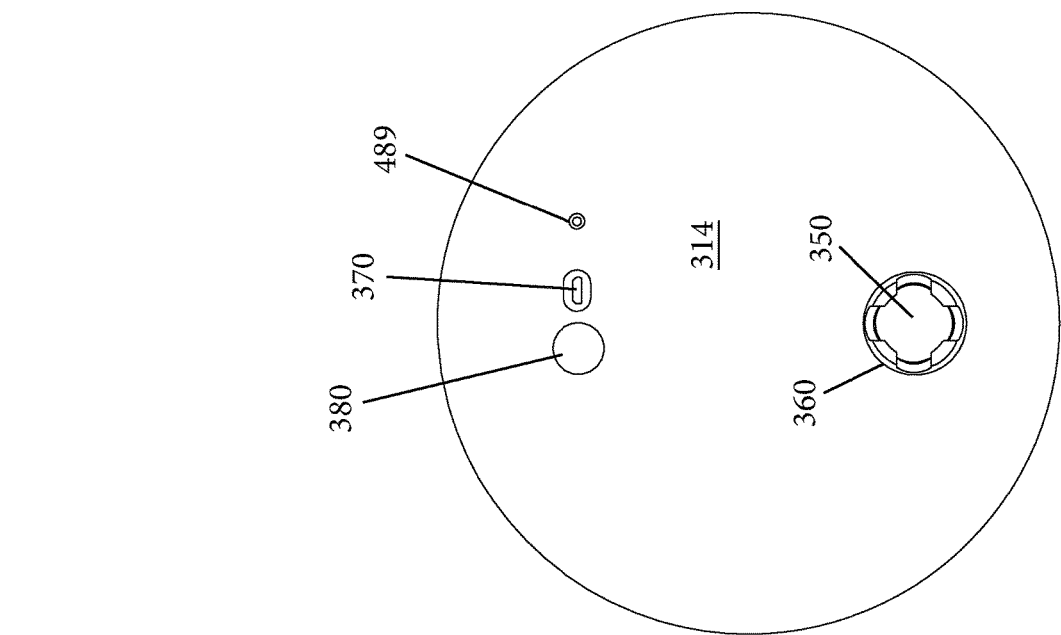
Figure 19:
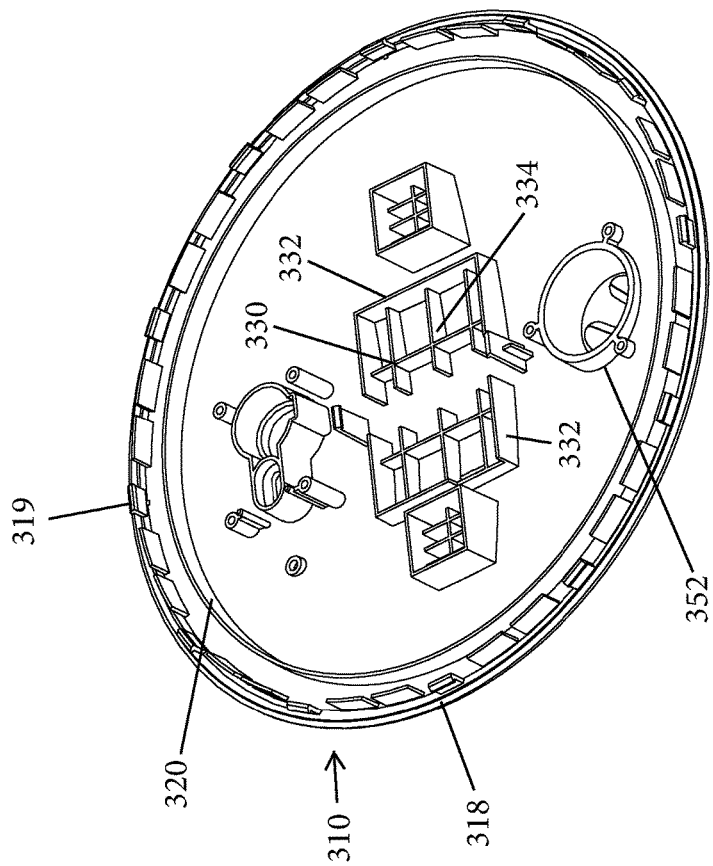
Figure 24:
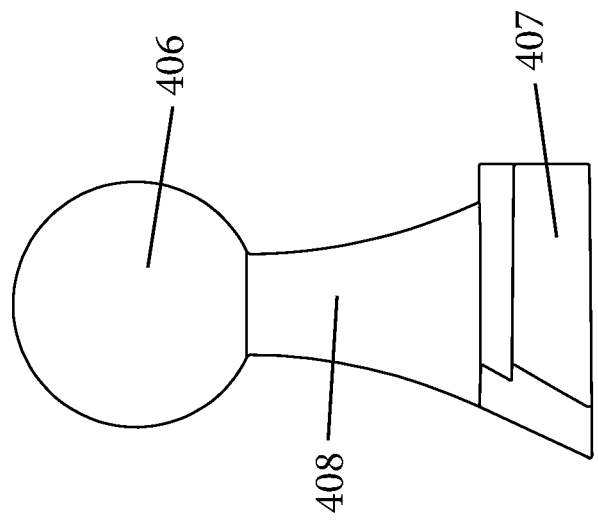
Figure 23:
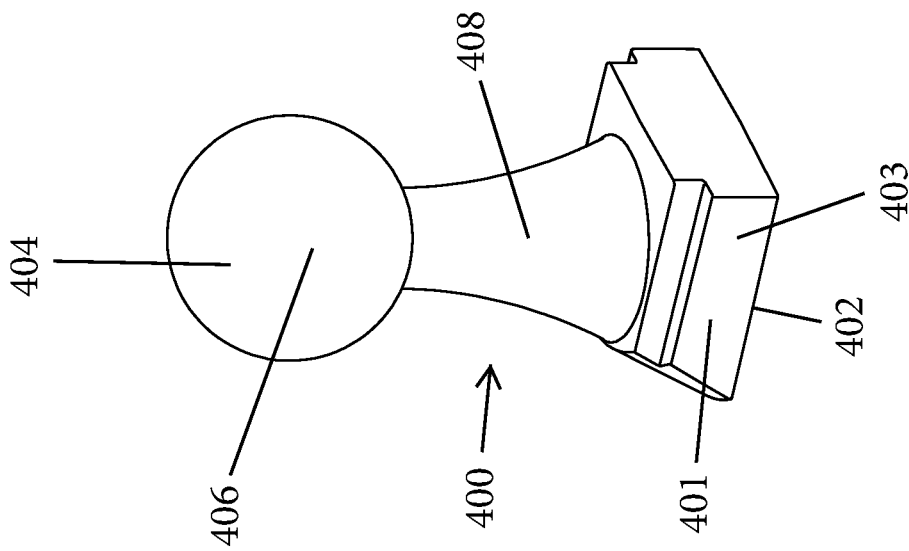
Figure 26:
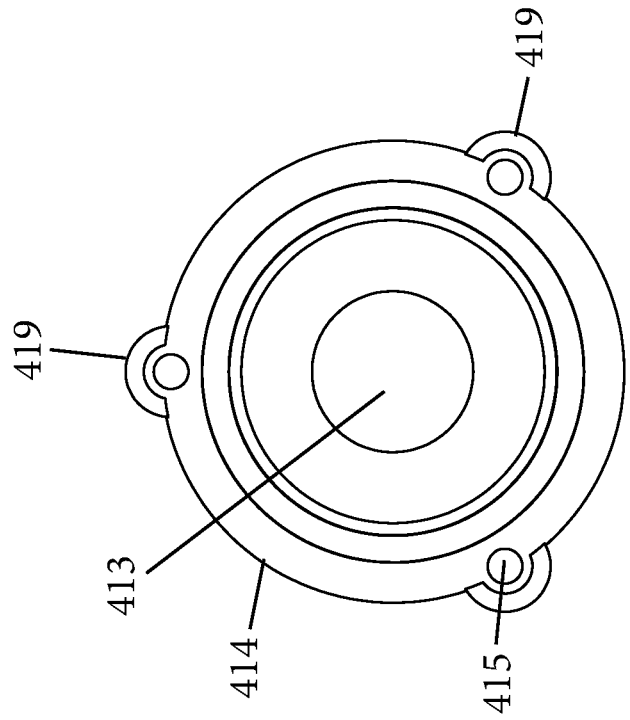
Figure 25:
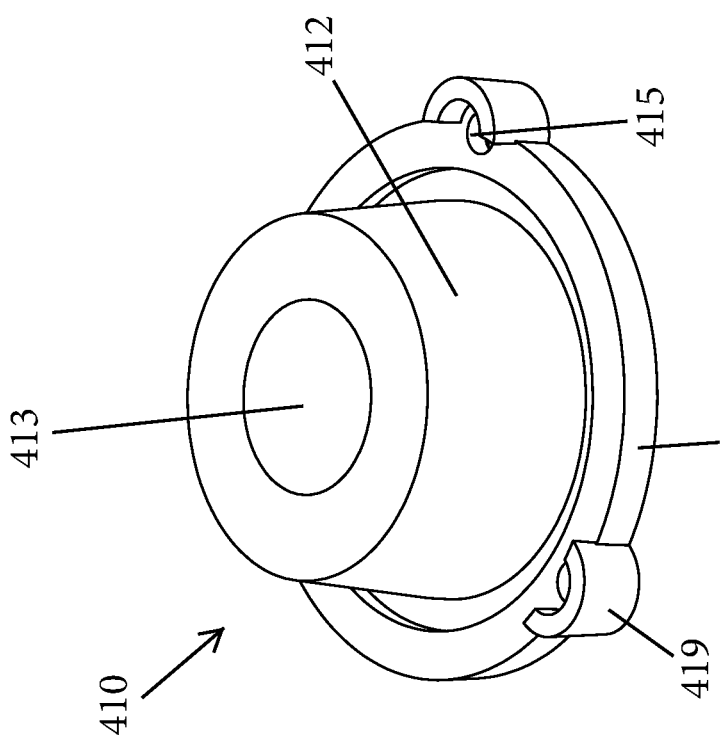
Figure 27:
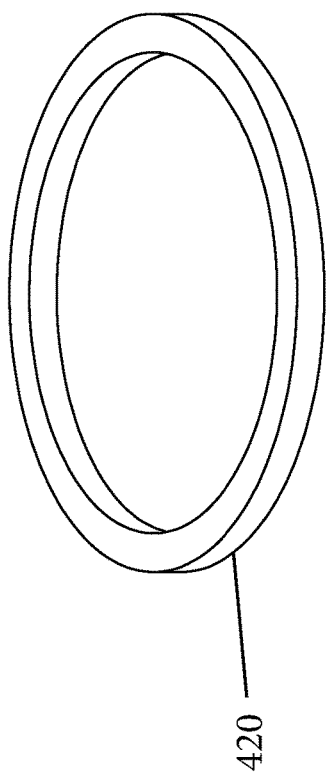
Figure 28:
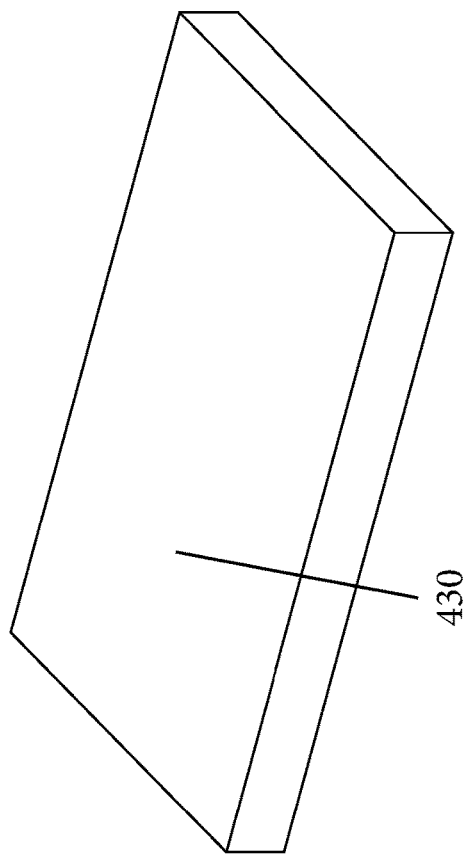
Figure 30:
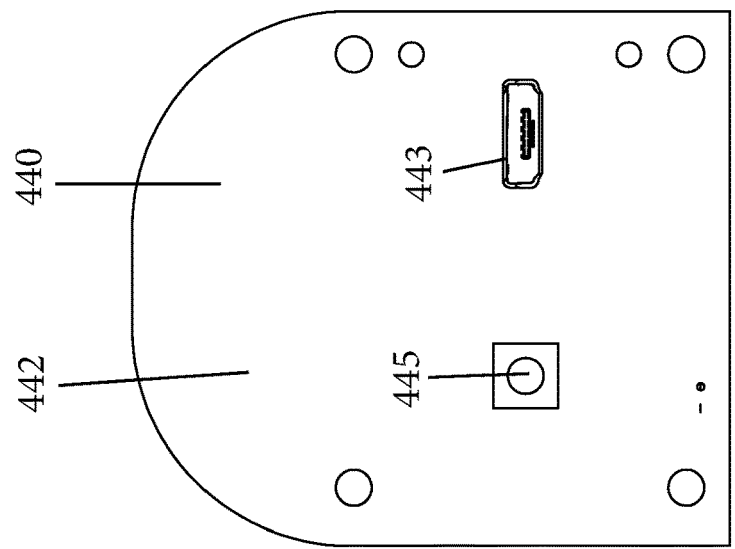
Figure 29:
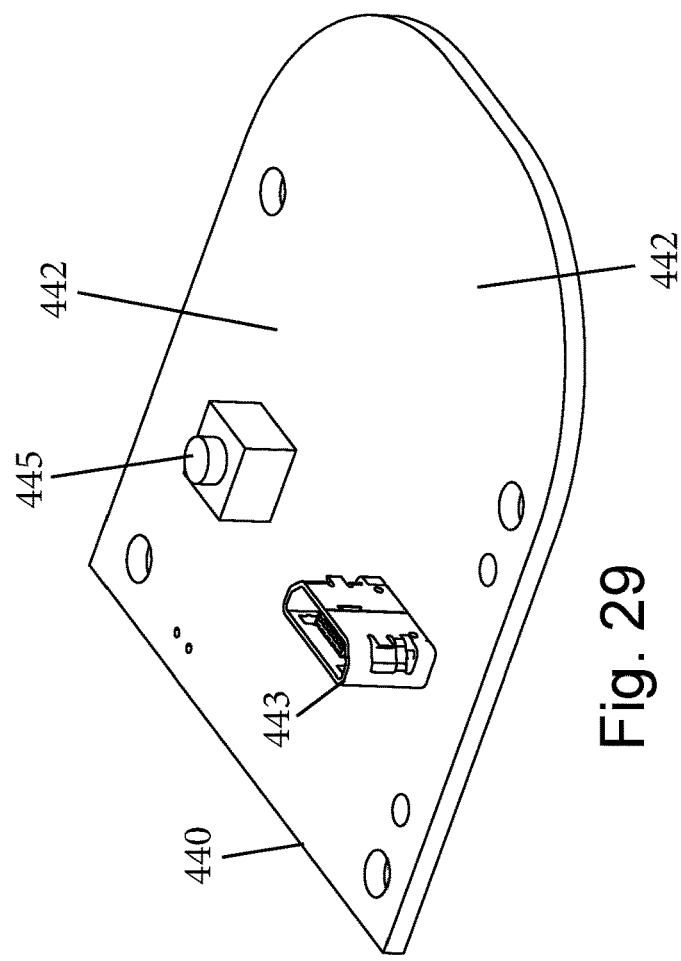
Figure 39:
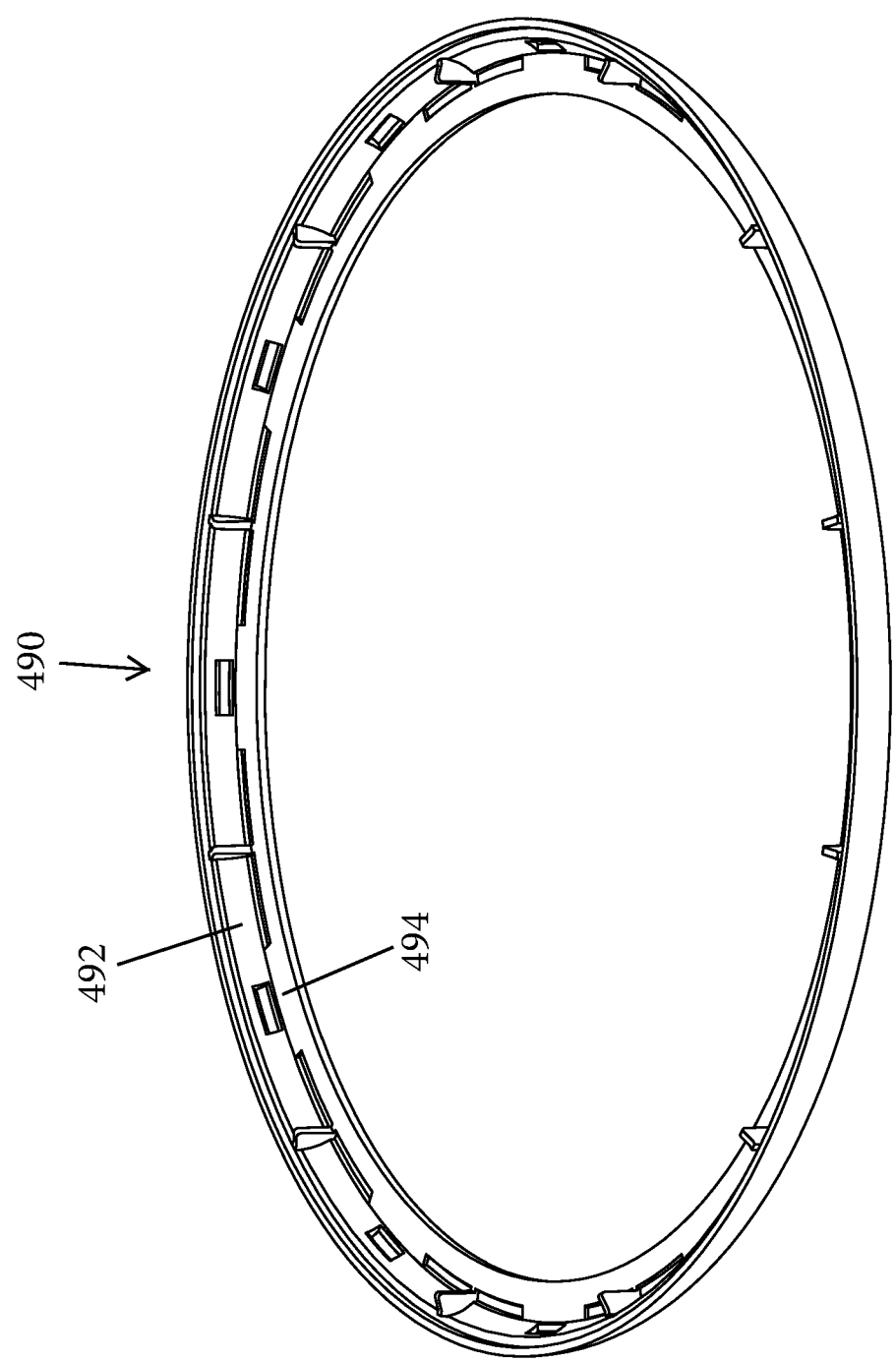
Figure 40:
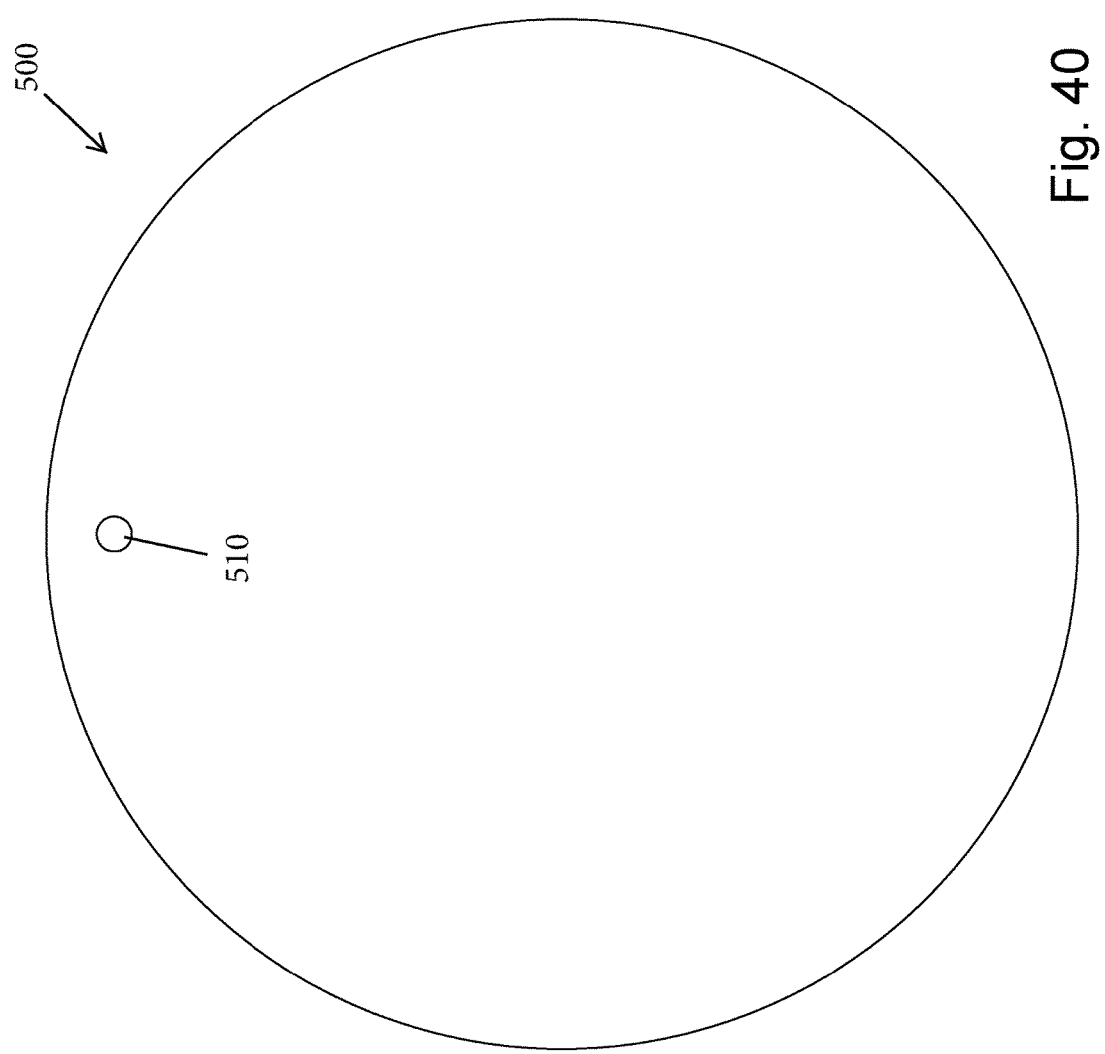
Figure 41:
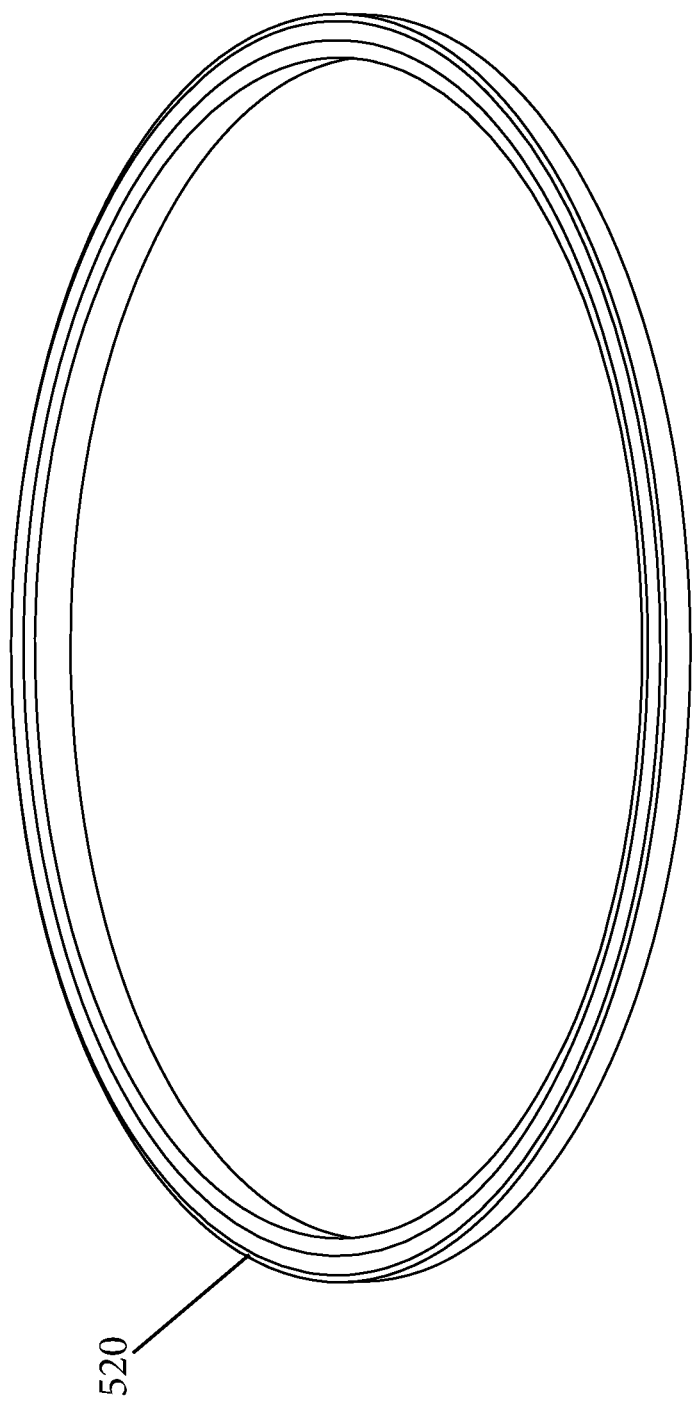
Figure 43:
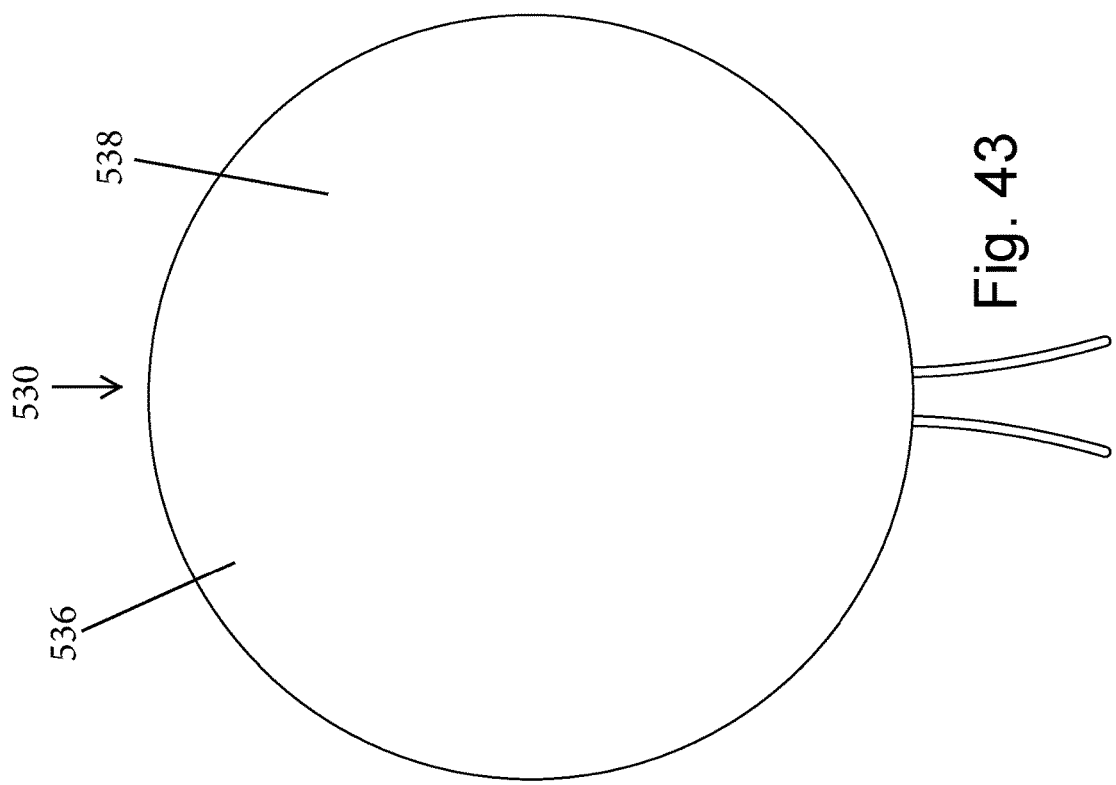
Figure 42:
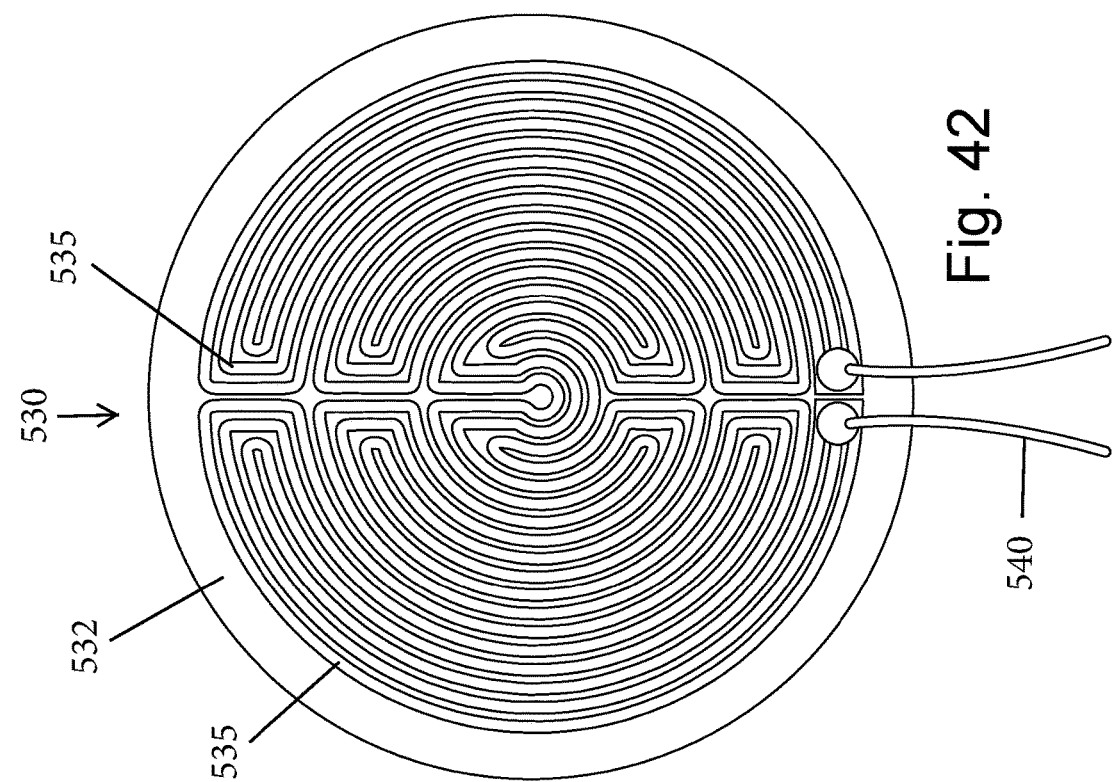
Figure 44:
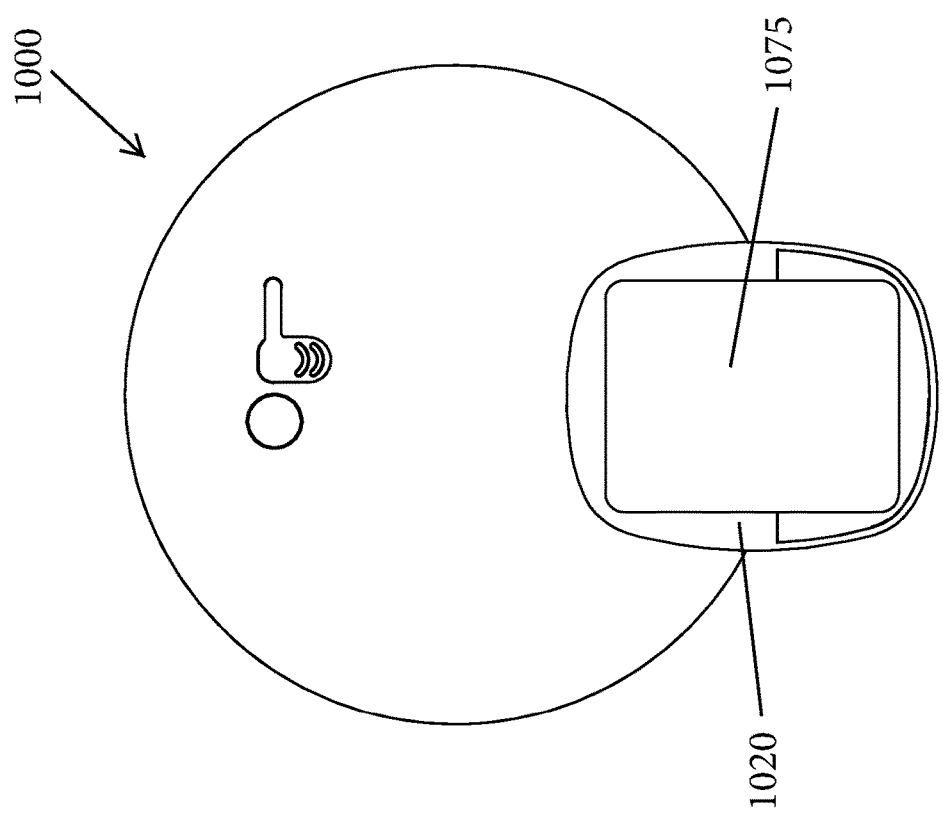
Figure 45:
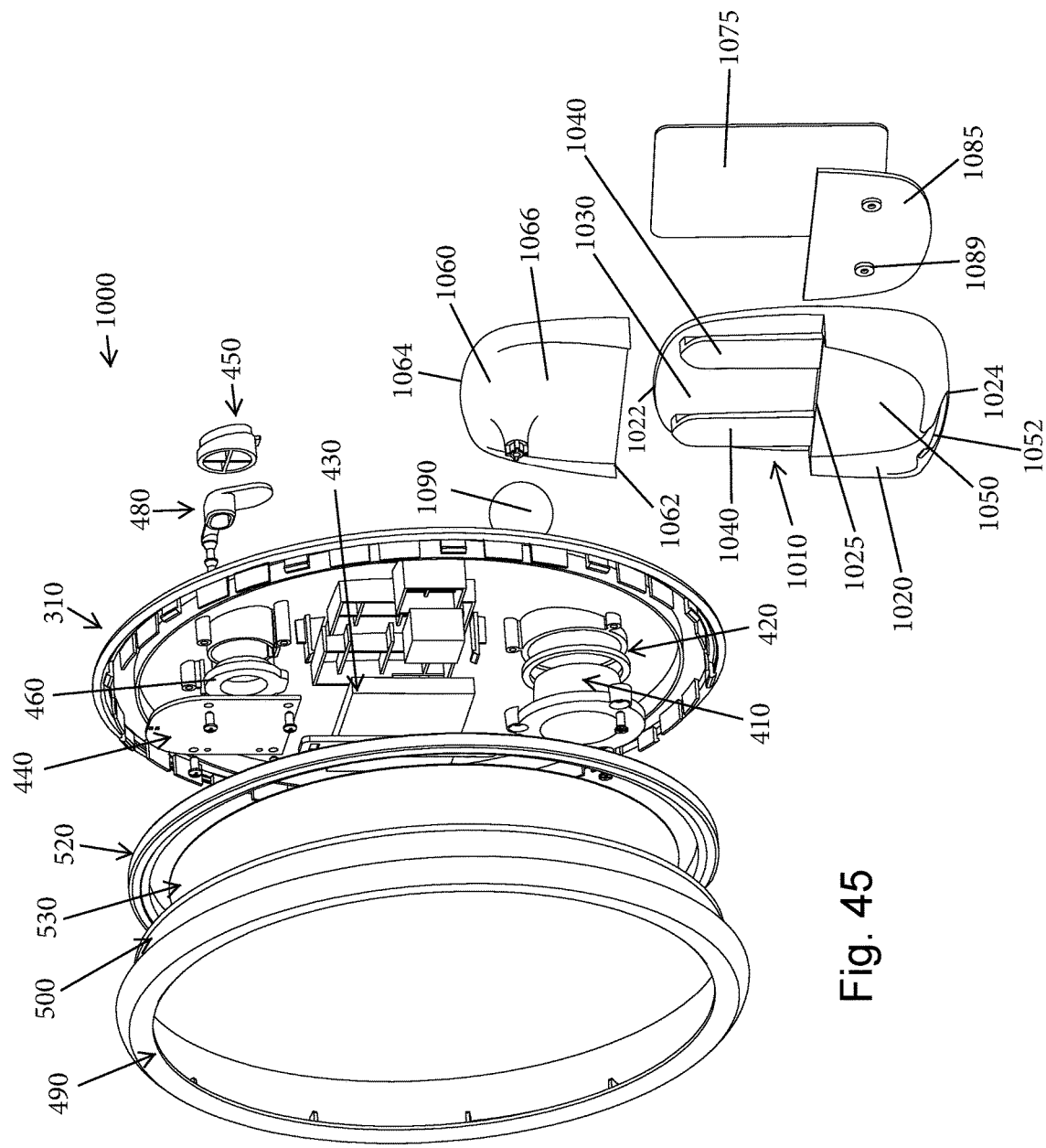
Figure 46:
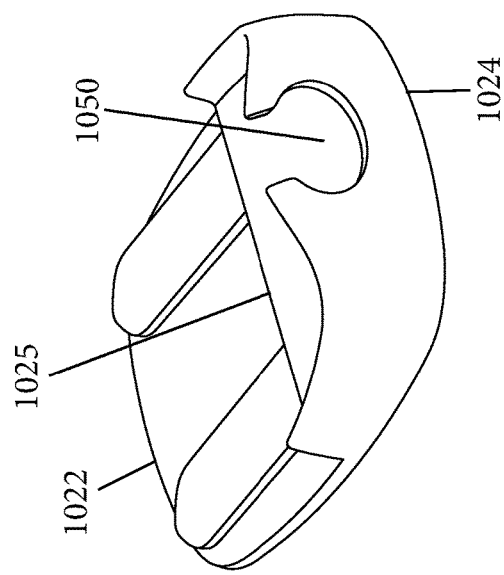
Figure 47:
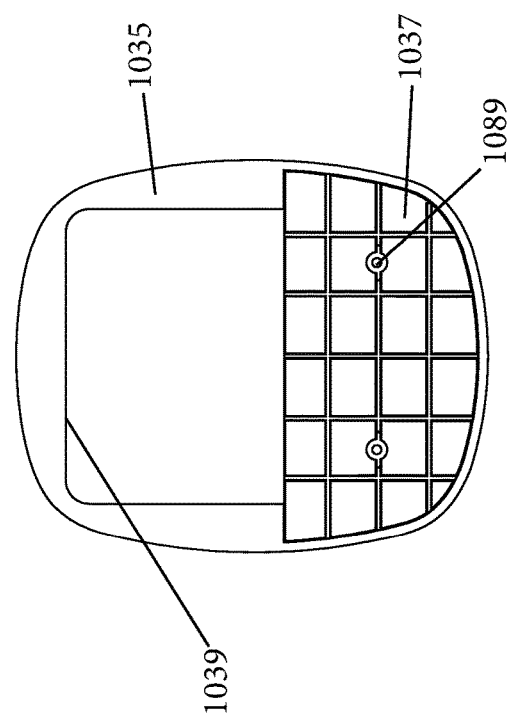
Figure 48:
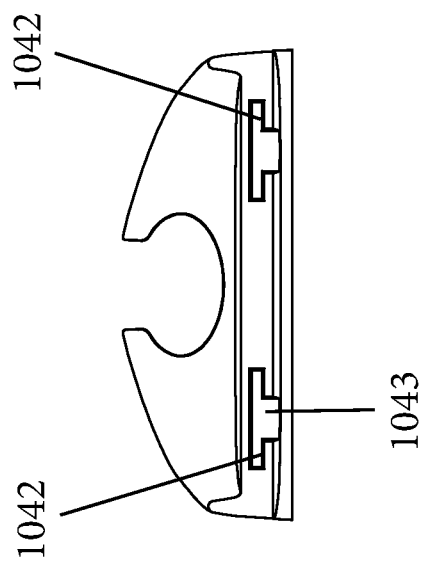
Figure 49:
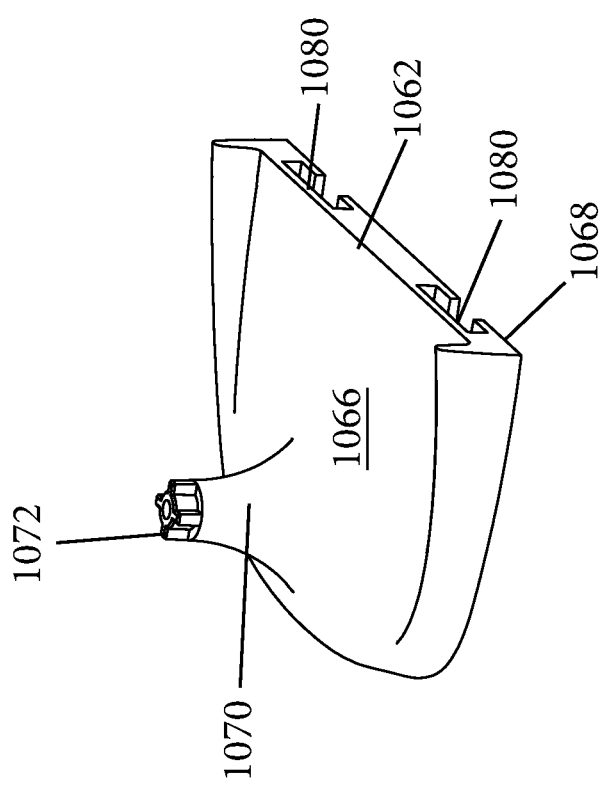
Figure 50:
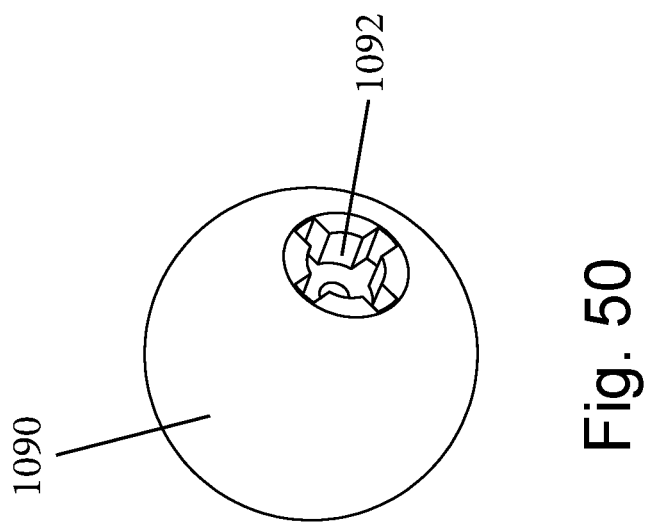
Figure 51:
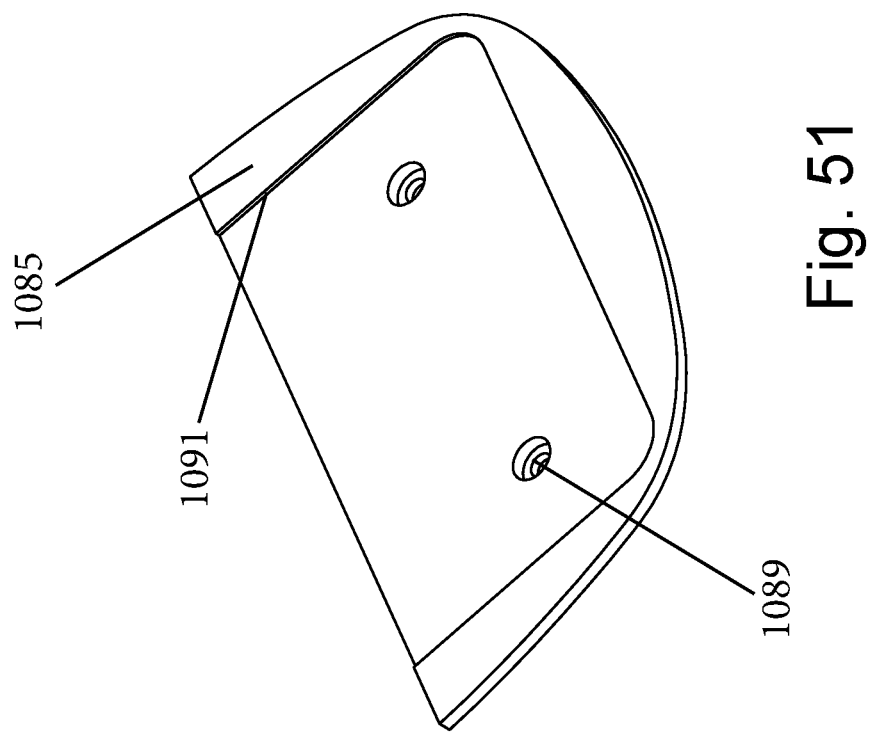

FIG. 1 is a front elevation view of a heated (fogless) mirror;

FIG. 2 is a side elevation view of the heated mirror;
FIG. 3 is a rear elevation view of the heated mirror;
FIG. 4 is an exploded view of the components that form the heated mirror;
FIG. 5 is a perspective view of a suction cup housing;
FIG. 6 is a top plan view thereof;
FIG. 7 is a bottom plan view thereof;
FIG. 8 is a side elevation view thereof;
FIG. 9 is a front elevation view thereof;
FIG. 10 is a rear elevation view thereof;
FIG. 11 is a perspective view of a suction cup cuff;
FIG. 12 is a top plan view thereof;
FIG. 13 is a side elevation view thereof;
FIG. 14 is a bottom view thereof;
FIG. 15 is a perspective view of a suction cup;
FIG. 16 is a side elevation view thereof;
FIG. 17 is a perspective view of an adhesive mount;
FIG. 18 is a side elevation view thereof;
FIG. 19 is a perspective view of a mirror housing;
FIG. 20 is rear elevation view thereof;
FIG. 21 is a front elevation view thereof;
FIG. 22 is a side elevation view thereof;
FIG. 23 is a perspective view of a ball joint;
FIG. 24 is side elevation view thereof;
FIG. 25 is a perspective view of a socket cap;
FIG. 26 is front elevation view thereof;
FIG. 27 is a perspective view of a socket cap gasket;
FIG. 28 is a perspective view of a battery;
FIG. 29 is a perspective view of a printed circuit board (PCB);
FIG. 30 is rear elevation view thereof;
FIG. 31 is a front elevation of a button;
FIG. 32 is a right elevation view thereof;
FIG. 33 is a perspective view of a button gasket;
FIG. 34 is a front elevation view thereof;
FIG. 35 is a top plan view thereof;
FIG. 36 is a front elevation view of a charging port plug;
FIG. 37 is a bottom plan view thereof;
FIG. 38 is a right side view thereof;
FIG. 39 is a perspective view of a lip;
FIG. 40 is a front elevation view of a mirror;
FIG. 41 is a perspective view of a mirror gasket;
FIG. 42 is a rear elevation view of heat film;
FIG. 43 is a front elevation view thereof;
FIG. 44 is a rear elevation view of a heated mirror according to another embodiment;
FIG. 45 is an exploded view of the components that form the heated mirror of FIG. 44;
FIG. 46 is a perspective view of a an adhesive mount housing;
FIG. 47 is a bottom plan view thereof;
FIG. 48 is an end elevation view thereof;
FIG. 49 is a front perspective view of a ball joint base;
FIG. 50 is a perspective view of a ball of the ball joint; and
FIG. 51 is a perspective view of a rear mounting plate.

DETAILED DESCRIPTION OF CERTAIN EMBODIMENTS

The following description is directed to a heated shaving mirror. The referenced device is now described more fully with reference to the accompanying drawings, in which one or more illustrated embodiments and/or arrangements of the apparatuses and methods are shown. The apparatuses and methods are not limited in any way to the illustrated embodiments and/or arrangements as the illustrated embodiments and/or arrangements described below are merely exemplary of the present apparatuses and methods, which can be embodied in various forms as appreciated by one skilled in the art. Therefore, it is to be understood that any structural and functional details disclosed herein are not to be interpreted as limiting the present application, but rather are provided as a representative embodiment and/or arrangement for teaching one skilled in the art one or more ways to implement the present apparatuses and/or methods. Moreover, just because a certain feature is depicted in combination with a particular set of other features, no intent to so limit the invention can be inferred and each feature can be combined with any other set of other features. Accordingly, certain aspects of the present apparatuses and methods can take the form of an entirely hardware embodiment or an embodiment combining software and hardware.

FIGS. 1-43 illustrate a heated (fogless) mirror 100 that is intended, in one embodiment, for use by a person shaving, and is particularly configured for use in a wet environment, such as within a bath or shower. The heated mirror 100 is also of a type that has an internal power source that does not require connection of the heated mirror 100 to a standard electrical wall outlet. More specifically and as described herein, the heated mirror 100 has a battery power source that is sealed in a water-resistant manner for powering a heating element that heats the mirror element itself.

As shown in FIGS. 1 and 2, the heated mirror 100 is formed of a number of subassemblies that form the complete assembled heated mirror 100 shown in FIG. 1. For example, the heated mirror 100 can be thought of as including a mount subassembly 200 and a mirror subassembly 300. The mount subassembly 200 is the portion of the heated mirror 100 that is configured for detachable (removable) attachment to a support surface, such as a wall of a shower or bath tub area in a bathroom. The mirror subassembly 300 not only includes the heated mirror portion but also include the power supply and the electronics and is adjustably attached to the mount subassembly 200 to allow for adjustment of the mirror subassembly 300 relative to the mount subassembly 200.

As shown in FIGS. 1-18, the mount subassembly 200 is formed of a number of parts that are coupled to one another to form the mount subassembly 200. The mount subassembly 200 includes a main housing 210. The main housing 210 is a hollow housing that has a front face 212 and an opposing rear face 214 that faces the support surface to which the mount subassembly 200 is attached. The main housing 210 has a top end 216 and an opposing bottom end 218. As shown, the main housing 210 includes a number of openings formed therethrough. For example, the main housing 210 includes a first opening or first through hole 220 that can be centrally formed in the main housing 210. The first opening 220 can have any number of different shapes and sizes with the illustrated one being circular in shape. The main housing 210 also includes a cutout 230 that is formed between the first opening 220 and the bottom end 218.

Proximate the top end 216 and along the front face 212, a recessed portion (notch) 240 is formed. As shown, the recessed portion 240 can be open along the top end 212 and can be defined by a pair of opposing side walls 242 and an inner wall 244 that defines a closed end of the recessed portion 240. As shown, each of the side walls 242 is in the form of a rail that as described below is used to couple the mirror subassembly 300 to the main housing 210. As shown, each of the side walls 242 has an undercut edge 243 with a top edge of the side wall 242 extending over the undercut edge 243.

As shown in FIG. 7, along the rear face 214 of the main housing 210, a number of structural support members can be formed. For example, an annular shaped structural support 250 can be formed about the first opening 220 and a plurality of support rails 259 connect this annular shaped structural support 250 to a peripheral side edge of the main housing 210 for providing reinforcement to the housing. One portion of the annular shaped structural support 250 defines the top edge of the cutout 230. Within the annular shaped structural support 250, there are plurality of first fastener holes 251 to permit reception of fasteners.

As shown, the main housing 210 generally has an oval or oblong shape (e.g., egg shaped). Along the front face, the peripheral side wall of the main housing 210 can be sloped.

The mount subassembly 200 includes a means for releasably yet securely mounting the mount subassembly 200 to the support surface (e.g., a wall). The figures illustrated two different techniques for securely mounting the mount subassembly 200 to the support surface. For example and according to one embodiment, the mount subassembly 200 uses a suction cup technique for mounting the mount subassembly 200 to the support surface. More specifically, the mount subassembly 200 can include a suction cup cuff 260 that is shown in FIGS. 11-14. The suction cup cuff 260 comprises a disc shaped body having a rear portion 262 and a raised front portion 264 that extends outwardly from the rear portion 262. The rear portion 262 has an annular shape about the circular shaped raised front portion 264 and is defined by a sloped wall 266. A bottom of the rear portion 262 is defined by a peripheral edge 267 that has a circular shape. As shown, the sloped wall 266 tapers inwardly toward the front portion 264.

The circular shaped front portion 264 is defined by a peripheral side wall 270 that can be formed at a right angle to the rear portion 262. The front portion 264 includes a through hole 272 that can be centrally formed. The through hole 272 can have a circular shape. Disposed circumferentially about the through hole 272 is a plurality of second fastener holes 275. The number of second fastener holes 275 is equal to the number of first fastener holes 251 and they are formed so as to be axially aligned with one another when the suction cup cuff 260 is mounted to the main housing 210. The suction cup cuff 260 is secured to the main housing 210 by disposing the raised front portion 264 within the annular shaped structural support 250 with the first fastener holes 251 and second fastener holes 275 being aligned with one another and the first opening 220 and the through hole 272. Fasteners, such as screws or the like, can be used to securely attach the suction cup cuff 260 to the main housing 210 by being passed through the aligned holes 251, 275. The holes 251 are not through holes but instead can be closed end threaded holes. The fasteners (not shown) thus pass through the holes 275 and into the threaded holes 251. By threadingly mating the fasteners with the threaded holes 251, the suction cup cuff 260 can be attached to the main housing 210.

The suction cup technique further includes a suction cup 280 that is configured to mate with both the suction cup cuff 260 and the main housing 210. The suction cup 280 includes a base suction cup 282 and a threaded post 285 that extends outwardly from an inner face 283 of the base suction cup 282. The threaded post 285 is preferably centrally located along the inner face 283. An outer face 286 of the base suction cup 282 is the surface that seats against the support surface. The outer face 286 can be a concave surface. The threaded post 285 can be a cylindrical shaped threaded screw. The threaded post 285 is configured to pass through the through hole 272 and the first opening 220 so that at least a distal end portion of the threaded post 285 protrudes beyond the front face of the main housing 210.

As is well understood, a suction cup uses a suction force to maintain its coupling to the support surface.

In order to control the operation of the suction cup mechanism and in particular, in order to tighten the suction cup, a controller 201 can be provided. For example, the controller 201 can be in the form of a knob for tightening the suction cup 280. The knob 201 is defined by a body 203 that resembles a cap and has a base portion 205 and an extending boss that extends rearwardly from the base portion 205. The boss has internal threads that are configured to threadingly mate with the outer threads on the free distal end of the threaded post 285 of the suction cup 280. This results in a connection between the knob 201 and the threaded post 285 such that rotation of the knob 201 is translated into rotation of the threaded post 285 which is part of the suction cup 280, thereby resulting in rotation of the suction cup 280. Since the first opening 220 can be a threaded opening, the rotation of knob 201 causes the suction cup 280 to be either driven towards the support surface when rotated in a first direction or away from the support surface when rotated in the opposite second direction. When driven toward the support surface, the suction cup 280 is driven into contact with the support surface to create negative pressure underneath the suction cup 280, thereby attaching the suction cup 280 to the support surface.

In yet another embodiment and instead of use of a suction cup, an adhesive mount 290 can be used as illustrated in FIGS. 17-18. The adhesive mount 290 provides an adhesive solution for mounting the mount subassembly 200 to the support surface. The adhesive mount 290 includes a base member 292 that can be disc shaped and includes a rear face 293 and an opposing front face 294. A threaded post 296 extends outwardly from the rear face 293. The threaded post 296 is configured to pass through the through hole 272 and the first opening 220 so that at least a distal end portion of the threaded post 296 protrudes beyond the front face of the main housing 210. Along the face 294 is an adhesive member, such as an adhesive tape, that is of a type that can support the weight of the mirror 100 when adhered to the support surface. A release layer is provided and covers the adhesive layer until time of use. As shown, a tab 299 structure is provided to prevent the adhesive mount from rotating within the cuff.

As shown in FIG. 1, when the mount subassembly 200 is assembled, the cutout 230 forms a razor holder since the suction cup cuff 260 at least partially closes off the backside of the cutout 230 so as to define a hollow cavity that receives and holds the razor.

The mirror subassembly 300 is the subassembly that includes the actual mirror itself and the electronics and power source and is also adjustably mounted to the mount subassembly 200 and more specifically, the main housing 210. In the illustrated embodiment, the mirror subassembly 300 is pivotably coupled to the main housing 210.

The mirror subassembly 300 includes a main mirror housing 310 that is best understood in view of FIGS. 4 and 19-40. The main mirror housing 310 is a generally concave circular body with a front face 312 and an opposing rear face 314. The main mirror housing 310 is defined by a rear wall 316 that acts as a floor and a peripheral side wall 318 that extends outwardly from the rear wall 316 and is formed proximate to a peripheral side edge of the rear wall 316. Along the outer surface of the side wall 318 is a plurality of spaced locking tabs 319. The locking tabs 319 are thus spaced circumferentially about the side wall 318. Within the peripheral side wall 318 is an annular shaped inner wall 320 that protrudes outwardly from the rear wall 316. The annular shape first inner wall 320 is spaced from the peripheral side wall 318 such that an annular shaped space 321 is formed therebetween. The heights of the peripheral side wall 318 and the first inner wall 320 can be different from one another and in particular, the height of the peripheral side wall 318 can be greater than a height of the first inner wall 320.

Within the first inner wall 320, the rear wall 316 includes a number of integral protrusions and also includes a number of openings formed therethrough. For example and with respect to the integral protrusions/protruding features, the rear wall 316 can include a central grid of raised rails or bars 330 that are connected to one another to define an outer peripheral raised border 332 and a plurality of inner connector rails 334 that connect to the raised border 332 and connect to one another so as to form a grid of boxes. The illustrated raised border 332 can have a square or rectangle shaped as shown and each box can likewise be square or rectangle shaped as shown. The height of the raised border 332 is uniform throughout and the height of the inner connector rails 334 is uniform throughout. The rear wall 320 can also have a plurality of bosses 340 that can have threaded holes and serve as a means for attaching another structure the rear wall 316 by threadingly mating fasteners to the threaded holes associated with the bosses 340. As shown, the bosses 340 can be on both sides of the raised rails 330.

As described herein, the aforementioned bar structure (grid structure) is formed so as to create a battery housing for holding a battery.

The rear wall 320 also has a first opening 350 formed therethrough, with the first opening 350 having a circular shape. As illustrated, an annular shaped second inner wall 352 is formed along the inner face of the rear wall 316 so as to surround the first opening 350 and an annular shaped outer wall 360 is formed along the outer face of the rear wall 316 so as to surround the first opening 350. The second inner wall 352 can be a smooth continuous wall, while the outer wall 360 can be a slotted wall in that a plurality of notches 361 are formed therein and spaced circumferentially thereabout. Each notch 361 is open at a distal end of the outer wall 360.

The rear wall 316 also includes a second opening 370 and a third opening 380 formed proximate the second opening 370. The first opening 350 is formed on one side (lower side) of the raised rails 330, while the second opening 370 and third opening 380 are formed on the other side (upper side) of the raised rails 330. About the second opening 370 is a third inner wall 390 that is formed along the inner face of the rear wall 320 so as to surround the second opening 370. The third inner wall 390 can have an oval or oblong shape. Similarly, about the third opening 380 is a fourth inner wall 392 that is formed along the inner face of the rear wall 320 so as to surround the third opening 380. The fourth inner wall 392 can have an annular shape. The second opening 370 and the third opening 380 can have different shapes and sizes as illustrated. In particular, the second opening 370 can be circular shaped, while the third opening 380 is more oval or oblong shape.

It will be appreciated that since the rear wall 316 has a concave shape, the heights of the protrusions formed along the inner face and outer face vary within each protrusion so as to provide a protrusion that has a top edge that lies within a common plane.

As shown in the figures, according to one embodiment, a ball-in-socket technique is used to pivotally couple the mirror subassembly 300, and in particular, the main mirror housing 310 to the mount subassembly 200. In particular, a ball-in-socket assembly includes a ball joint 400 that is configured to be securely coupled to the main housing 210 of the mount subassembly 200. The ball joint 400 is an elongated structure that has a first end 402, which can be thought of as being a proximal end, and an opposing second end 404, which can be thought of as being a distal end.

The second end 404 includes a ball 406 at the end of a stem 408, while the first end 402 includes a locking block 401. The stem 408 can have a frustoconical shape and tapers inwardly toward the ball 406 such that the stem 408 becomes progressively smaller in width in the direction of the ball 406. The locking block 401 has opposing side walls 403 each of which has a stepped construction so as to define a locking rail on which side wall 403.

The locking block 401 is configured to be received within the recessed portion 240 of the main housing 210 such that the locking block 401 is securely retained therein. The locking block 401 is inserted into the recessed portion 240 with the tab 405 facing inward. The side walls 403 are inserted such that the locking rails formed along the side walls 403 are received within the undercut edge 243 portion below the top edge of the side walls 242. In other words, the locking rails along the side walls 403 are received within the reduced width area defined by the undercut edge 243. The tab 405 is received within the locking slot 247 of the inner wall 244. Within the locking slot 247, a recessed portion or groove is provided for receiving the locking lip 409 so as to lock the locking block 401 within the recessed portion 240. Once the locking block 401 is locked in place, the stem 408 protrudes outwardly from the main housing 210 and more particularly, the stem 408 protrudes at a right angle relative to the main housing 210. The ball 406 is located beyond the outer face of the main housing 210.

The ball 406 is received within the first opening 350. The ball-in-socket technique includes a socket cap 410 and a socket cap gasket 420. The socket cap 410 comprises a tubular structure that has a main body 412 and a peripheral flange 414 that is integrally formed at one end of the main annular body 412. The main body 412 can have an inwardly tapered construction in that the main body 412 tapers inwardly in a direction away from the flange 414. The main body 412 also includes a concave circular shaped recess 413 formed at the top end thereof. The recess 413 is configured to receive the ball 406 and in particular, the recess 413 represents the socket that receives the ball 406 to allow a movable and adjustable connection between the mount assembly 200 and the mirror assembly 300.

The peripheral flange 414 has an annular shape and includes a plurality of fastener sections 419 that are formed along the peripheral flange 414 and comprise enlarged areas that have openings 415 that receive fasteners (not shown) for attaching the socket cap 410 that mate with and are aligned with bosses 340. In particular, the peripheral flange 414 and the socket cap gasket 420 seat against the exposed upper edge of the second inner wall 352. The socket cap gasket 420 sits in a channel in the socket cap that is within the edge (peripheral flange) 414. The fastener sections 419 of the peripheral flange 414 seat against corresponding threaded bosses 340 to allow the socket cap 410 to be secured to the second inner wall 352/main mirror housing 310 using screws or other type of fasteners.

When the socket cap 410 is attached to the second inner wall 352, the main annular body 412 of the socket cap 410 is received within the central opening formed between the second inner wall 352. The main body 412 of the socket cap 410 comprises the socket of the ball-in-socket arrangement in that the ball 408 is configured to be snap-fittingly (friction fit) retained within the main body 412. The slotted nature of the outer wall 360 permits reception of the ball 408 in that the slotted outer wall 360 has a degree of flexing to accommodate insertion of the ball 408.

The socket cap gasket 420 can be in the form of an O-ring or the like that forms a seal between the peripheral flange 414 and the exposed upper edge of the second inner wall 352.

As previously mentioned, the mirror 100 is powered by a local power source that does not need an electrical connection to an outlet for powering the mirror 100. In the illustrated embodiment, the local power source comprises a battery 430. The battery 430 can comprises any number of suitable batteries and in the illustrated embodiment, the battery 430 comprises a rechargeable battery, such as a class 1000MAH battery. As illustrated, the battery 430 is in the form of a square or rectangular power battery pack that has a smooth front face and a smooth opposite rear face. The battery 430 is configured for placement on the central grid of raised rails or bars 330. In particular, the battery 430 is for placement within the raised outer border 332. The battery 430 is thus held in a stable and planar manner along the grid of raised rails 330. As shown in the figures, a clip can be added on the cover that acts to securely hold the battery 430 within the raised outer border 332. As set forth herein, the battery 430 is electrically connected to the electronics (PCB).

The heated mirror 100 includes a printed circuit board 440 (FIG. 29) that is electrically connected to the battery 430 since the battery 430 provides power thereto. Typically, this connection can be made through wires and/or electrical contacts. The printed circuit board 440 can take any number of shapes and sizes and is disposed within the main mirror housing proximate the battery 430. In the illustrated embodiment, the printed circuit board 440 is located proximate the second opening 370 and the third opening 380.

FIGS. 29-30 best illustrate the printed circuit board 440. The printed circuit board 440 has a front surface or face and an opposing rear surface or face 442. As shown, the rear face 442 has an electrical connector 443 that protrudes outwardly therefrom and also includes an on/off actuator 445 that also protrudes outwardly therefrom and is spaced from the electrical connector 443. For example, the electrical connector 443 can be a female USB plug or other type of connector that receives a complementary male plug for establishing an electrical connection therebetween to permit recharging of the battery 430. The on/off actuator 445 can be switch or the like. As shown, the on/off actuator 445 is in the form of a button or switch that can be depressed. It will be appreciated that the connector 443 and actuator 445 face rearwardly. The PCB 440 can include an LED which illuminates when the heated mirror is powered up as described below.

In order to control operation of the heated shaver 100, there are one or more controls provided to the user. In the illustrated embodiment, there is a single control 450, namely, an on/off control 450. The on/off control 450 can take any number of different forms with the illustrated on/off control 450 taking the form of a button (FIGS. 31-32). The on/off control button 450 can include a first (bottom) portion 452 and a second (top) portion 454 that has a small diameter so as to form a shoulder between the two portions 452, 454.

As shown, the exposed top surfaces of each of the first portion 452 and the second portion 454 can be angled (slanted).

As shown in FIGS. 33-35, a button gasket 460 can be provided for turning the heated shaver 100 on and off. The button gasket 460 is an elongated structure with a first face 461, an opposing second face 462, a first end 463 and an opposing second end 464. The first face 461 faces inward toward the battery 430 and the interior of the housing. The button gasket 460 can be formed of any number of suitable materials that have the desired degree of flexibility.

As shown, the button gasket 460 has an opening 465 (through opening) formed near the first end 463. The opening 465 is complementary to the second opening 370. For example, the opening 465 and the second opening 370 has an oval or oblong shape. As described herein, these aligned openings are intended to contain the electrical connector 443 (charging port) that is configured to recharge the battery. For example, the electrical connector 443 can be a female charging port that receives a male charging plug that is connected by a wire to an electrical plug that is inserted into a standard electrical wall outlet to charge the battery 430. The female charging port 443 is thus operatively and electrically connected to the battery 430.

The button gasket 460 is thus configured to mate with both the third inner wall 390 that surrounds the second opening 370 and the fourth inner wall 392 that surrounds the third opening 380. As shown in the figures, the second face 462 of the button gasket 460 has a first track 468 formed about the opening 465 and includes a second track 469 that is formed about a raised button 470 that protrudes outwardly from the second face 462. The raised button 470 is integrally formed with the rest of the body of the gasket 460. The raised button 470 can have any number of different shapes including a circular shape as shown. The raised button 470 is a hollow structure that is configured to receive the actuator 445 so that the raised button 470 is in contact with or can easily be driven into contact with the actuator 445.

The first track 468 receives the third inner wall 390, while the second track 469 receives the fourth inner wall 392. The mating of the button gasket 460 to the third and fourth inner walls 390, 392 results in the raised button 470 being disposed within the hollow interior of the annular shaped fourth inner wall 392. The raised button 470 acts as an actuator in that when the user presses the plastic button 450 that sits on the raised button 470 in an inward direction, the raised button 470 causes the actuator (PCB switch) 445 to depress, thereby causing a signal to be sent to the printed circuit board 440.

A charging port plug 480 can also be provided and comprises a base portion 482 with an arm 484 that extends radially outward therefrom. At a distal end of the arm 484, there is a downwardly extending finger or post 486 that can be generally cylindrical in shape. As shown, the free end of the finger 486 can lie below the bottom surface of the base portion 482 as shown in FIG. 36. The base portion 482 is a generally hollow structure (hollow interior 487) that is configured to receive and cover the female charging port 443. The finger 486 is the means by which the charging port plug 480 is coupled to the mirror body housing 310. In particular, the floor 316 of the housing 310 includes a hole 489 (FIG. 20) that receives the free distal end of the finger 486 to permit the charging port plug 480 to be attached to the rear face 314 of the housing 310.

The charging port plug 480 is formed of a flexible material (such as rubber or flexible plastics) to allow the charging port plug 480 to be readily bent and manipulated so as to cover and uncover the female charging port 443.

FIG. 39 shows a lip 490 that is annular shaped. The lip 490 can have a curved (beveled) side wall 492 and includes a floor 494 that is formed as a right angle to the side wall 492 and defines a ledge. The lip 490 is configured to mate with the outer wall 318 of the main mirror housing 310. The lip 490 can thus be thought of as being a front part of the mirror housing, while the main housing 310 can be thought of as being a rear part.

Along the inner surface of the side wall 492, there can be features that complement and engage the locking tabs 319 so as to position the lip 490 circumferentially about the side wall 318 of housing 310. These features can be in the form of recesses, openings, or tabs that engage the locking tabs 319 to secure the lip 490 to the housing 310.

A mirror 500 (FIG. 40) is provided and can take different shapes and sizes. In the illustrated embodiment, the mirror 500 is a circular shaped mirror. The mirror 500 includes a small area 510 that allows light, such as an LED light, to pass through. This area 510 can be a frosted glass area for an LED light that can be associated with the PCB that illuminates when the mirror 100 is powered on to provide a visual indicator to the user to easily indicate it is powered on. The mirror 500 engages a mirror gasket 520 shown in FIG. 41. The mirror gasket 520 is an annular shaped gasket formed of a flexible material, such as TPR. The side wall of the mirror gasket 520 can have an inward tapered portion. The mirror 500 is designed to fit on top of the mirror gasket 520 such that the inner surfaces of the mirror gasket 520 contact the outer surfaces of the mirror 510. Along the outer face of the mirror gasket 520, an annular shaped landing is provided on which the mirror 500 can seat.

FIGS. 42 and 43 illustrate a heating element 530 that is for placement behind the mirror 500 for controlled heating thereof. The heating element 530 thus has a complementary shape as the mirror 500 and therefore, can have a circular shape. The heating element 530 is in the form of a heat film that comprises an extremely thin (approximately 2 mm thick). Along a rear surface 532 of the heating element 530 a conductive pattern 535 (leads or conductive wires, etc.) can be visible. Along a front surface 536 is an adhesive layer that is covered with a release layer 538. The adhesive on the front surface 536 is designed to secure the heating element 530 to the rear of the mirror so as to place the heating element 530 in contact with the mirror. The heat generated from the heating elements easily passes through the adhesive layer and heats the mirror.

Due to thinness of the heating element 530, the heating element 530 is also flexible. This means that the heating element 530 can be applied to a concave magnification mirror if desired.

The adhesive layer allows for easy attachment of the heating element 530 to the backside of the mirror 510. The heating element 530 includes one or more wires 540 connected thereto. The wire(s) 540 connect the heating element 530 to the battery 430. One wire 540 can be attached to the heating element 530, while the other wire 540 can be attached to the PCB 440.

As shown, a diameter of the heating element 530 can be less than the diameter of the mirror 500. The heating element (heat film) 530 also serves to help protect against mirror shattering if the mirror drops.

To operate the heated mirror 100, the user first selects a mounting site, such as a tile of the bathtub or shower. Then the mount subassembly 200 is used to detachably, yet securely, attach the heated mirror 100 to the tile or other support surface. Once mounted, the heated mirror 100 can be adjusted due to the ball-in-socket construction in that the mirror subassembly 300 can be pivotally adjusted relative to the mount subassembly 200. The mirror subassembly 300 is spaced forward of the mount subassembly 200 so as to allow the user to access the backside of the mirror subassembly 300. The control button 450 is then depressed to turn on the heated mirror 100 and in particular, to activate the heating element 530. Energy from the battery 430 is used to power the heating element 530 and cause electricity to flow through conductive elements thereof to generate heat that is transferred to the mirror 500. Power on is indicated by illumination of the LED through the area 510 of the mirror 500. After use, the control button 450 is depressed again to turn off the heated mirror 100. When needed, the battery 430 is charged using the charging port along the rear of the mirror subassembly 300. It will be appreciated that a low battery condition can be visually indicated to the user by the LED visible through mirror area 510. For example, the LED can blink and/or turn a different color.

FIGS. 44-51 illustrate a heated (fogless) mirror 1000 that like mirror 100 is intended, in one embodiment, for use by a person shaving, and is particularly configured for use in a wet environment, such as within a bath or shower. The heated mirror 1000 is similar to the heated mirror 100 and therefore, like elements are numbered alike.

As described herein, the mirror 1000 utilizes an adhesive mount option for mounting the mirror 1000 to a support surface, such as a wall. Accordingly, the mirror 1000 includes an adhesive mount 1010 that includes a mount housing 1020. The mount housing 1020 has a first end 1022 and a second end 1024. The mount housing 1020 has a first face 1030 and an opposing second face 1035 (FIG. 47). The rear face 1035 includes a region 1037 near end 1024.

Along the first face 1030 there a pair of locking rails 1040 that are spaced apart from one another and are parallel to one another. As shown in FIG. 48, each locking rail 1040 can be T-shaped with an enlarged top wall 1042 supported on a post 1043. The locking rails 1040 extend longitudinally. As with the prior embodiment, the housing 1020 can include an area 1050 that is constructed to receive and hold one or more objects, such as a razor. The area 1050 can includes an opening or slot 1052 to allow easier access to this space and to allow for removal of the one or more object.

The mount assembly also includes a mount cover 1060. The mount cover 1060 includes a first end 1062 and an opposing second end 1064. The mount cover 1060 also includes a first face 1066 and an opposing second face 1068. The first end 1062 is intended to seat against an edge 1025 when the mount cover 1060 is mated to the mount housing 1020 as described herein. The mount cover 1060, the first face 1066 includes an integral stem 1070 that extends and protrudes outwardly from the first face 1066. A distal end of the stem 1070 is a keyed structure 1072. For example, the keyed structure can include a center hub with a plurality of spokes extending outwardly therefrom. In the illustrated embodiment, there are four spokes that are arranged in pairs so as to depict a cross-hair structure.

Along the second face 1068, the mount cover 1060 has a pair of locking slots 1080 that have complementary shapes relative to the locking rails 1040. Thus, in the illustrated embodiment, each locking slot 1080 has a T-shape that mates with the T-shape in a sliding manner. When the cover 1060 slides over the locking rails 1040, the end 1062 is brought into contact with the edge 1025.

FIG. 50 illustrates a ball 1090 that mates with the stem 1070 to form a ball joint. More particularly, the ball 1090 has a keyed hole 1092. The keyed hole 1092 is configured to receive the keyed structure 1072 at the distal end of the stem 1070. This keyed relationship prevents rotation of the ball 1090 on the stem 1070.

The ball 1090 is intended for reception with the socket cap 410 to define a ball joint and permit pivoting of the mirror relative to the mount base 1020.

A back plate 1085 is intended for placement in the region 1037 of the second face 1035 and can be secured along points 1089 with fasteners or the like to the mount housing 1020. As shown in FIGS. 45 and 51, the back plate 1085 has a rear face that includes a recessed portion 1091. As shown in FIG. 47, the second face 1035 has a recessed portion 1039. When the back plate 1085 is secured to the mount housing 1020, the recessed portions 1039 and 1091 are combined to form a single recessed area.

An adhesive mount pad 1075 is received within the recessed portions 1039, 1091. The pad 1075 can have any number of shapes, including a rectangular shape. Thus, the pad shape and the recessed area match and are complementary to one another. The pad 1075 can be a double sided adhesive pad. The pad 1075 can thus be adhesively secured or otherwise secured to the second face 1035 and then a release cover on the other face of the adhesive pad 1075 is removed to allow the mount assembly to be secured to the support surface (wall).

The mount housing 1020 has a first face 1030 and an opposing second face 1035 (FIG. 47). The rear face 1035 includes a region 1037 formed near end 1024.

It should be understood that the foregoing embodiments and examples are illustrative of the heated mirror of present application and are nonlimiting. While specific embodiments are described above, those of skill in the art will readily be able to envision additional embodiments, modifications and variations all within the scope of the claims set forth below including equivalents.

What is claimed is:

1. A portable heated mirror comprising:
   a mount subassembly including a mount housing and a mount member that is configured to releasably attach the heated mirror to a support surface;
   a mirror subassembly that is pivotally and detachably coupled to the mount subassembly such that the mirror subassembly can be completely detached from the mount subassembly and remain fully operative, the mirror subassembly including a mirror housing that contains a mirror and a flexible heating element that is disposed relative to a rear surface such that when the flexible heating element is actuated, heat is generated along the rear surface of the mirror; and a battery power source that is operatively connected to heating element.

2. The portable heated mirror of claim 1, the mount member is a suction cup that is coupled to a suction cup cuff and the mount housing, the suction cup cuff being coupled to the mount housing.

3. The portable heated mirror of claim 2, further including a knob coupled to a post of the suction cup such that rotation of the knob is translated into movement of the suction cup, the knob being disposed along a front face of the mount housing, the suction cup and suction cup cuff being disposed along a rear surface of the mount housing.

4. The portable heated mirror of claim 1, wherein the mount member comprises an adhesive mount that is coupled to the mount housing and includes an adhesive layer of a rear surface thereof.

5. The portable heated mirror of claim 1, wherein the mount housing includes a recessed portion and a cutout that defines an interior space for holding an object, the mirror subassembly including a ball joint member that is interlockingly, yet detachably, coupled to and slidingly received within the recessed portion of the mount housing, the ball joint member having a ball at a free end thereof that mates with a socket of the mirror subassembly resulting in the mirror subassembly being pivotally coupled to the ball joint member and also to the mount subassembly, the ball joint member further having an elongated stem portion that is received within the recessed portion of the mount housing for detachably coupling the mirror subassembly to the mount subassembly.

6. The portable heated mirror of claim 5, wherein a rear surface of the mirror housing includes a socket into which the ball of the ball joint member is received for pivotally attaching the mirror subassembly to the ball joint member and the mount subassembly includes a suction cap that is configured to detachably attach to the support surface.

7. The portable heated mirror of claim 5, wherein recessed portion is open along a top peripheral edge of the mount housing and the cutout is formed along a bottom peripheral edge of the mount housing such that when the mirror subassembly being is pivotally coupled to the mount subassembly, the cutout is fully exposed and accessible for holding the object.

8. The portable heated mirror of claim 1, wherein the mount subassembly is coupled to the mirror subassembly by a ball-in-socket arrangement.

9. The portable heated mirror of claim 1, wherein the battery power source is disposed between a rear part of the mirror housing that contains the mirror and the flexible heating element and further including an actuator that is operatively coupled to a printed circuit board that is operatively connected to the battery power source, the actuator and printed circuit board being configured to turn the flexible heating element to either an on state in which the conductive elements are energized or an off state in which energy is not delivered to the conductive elements, the rear part of the mirror housing being configured to mate with the mount subassembly.

10. The portable heated mirror of claim 9, wherein the printed circuit board includes a recharging connector that extends outwardly therefrom and passes through a through hole formed in the mirror housing so as to accessible along a rear surface of the mirror housing, the recharging connector being operatively connected to the battery power source for recharging thereof and the actuator comprises a button.

11. The portable heated mirror of claim 10, wherein the heating element comprises a flexible film that includes conductive elements formed therein and that are electrically connected to the battery power source.

12. The portable heated mirror of claim 11, wherein the heating element has an adhesive layer formed on one face thereof for attaching the heating element to a rear face of the mirror.

13. The portable heated mirror of claim 11, wherein the heating element is capable of being bent into a curved shape to permit attachment to the mirror which has a concave shape.

14. The portable heated mirror of claim 11, wherein the mirror is disposed between an outer lip part that represents a front part of the mirror housing and a mirror gasket that surrounds the mirror and is disposed within the outer lip part.

15. The portable heated mirror of claim 14, wherein the lip is snap-fittingly attached to locking tabs that are formed as part of a peripheral side wall of the rear part of the mirror housing, the mirror gasket being disposed along an inner surface of the peripheral side wall.

16. The portable heated mirror of claim 1, wherein the flexible heating element has a thickness of about 2 mm.

17. A portable heated mirror comprising:
a mount subassembly including a mount housing and a mount member that is configured to attach the heated mirror to a support surface, wherein the mount housing includes a notch formed therein and open along a perimeter of the mount housing;
a mirror subassembly that is pivotally attached to the mount subassembly by a ball-in-socket arrangement that includes a ball member that has a ball at a first end and a locking block at an opposing second end that is configured for sliding insertion into the notch of the mount housing for detachably coupling the mirror subassembly to the mount subassembly such that the mirror subassembly can be completely detached from the mount subassembly, the mirror subassembly including a mirror housing that contains a mirror and a flexible heating element in the form of a flexible heat film that contains heating elements and is secured to a rear surface of the mirror for heating the mirror when the flexible heat film is actuated; and
a battery power source that is operatively connected to a printed circuit board that is contained within the mirror housing.

18. The mirror of claim 17, wherein the flexible heat film is adhesively bonded to the rear surface of the mirror.

19. The mirror of claim 17, wherein the mirror housing includes a socket that protrudes rearwardly from the mirror housing and receives the ball of the ball member.

20. A portable heated mirror comprising:
a mount subassembly including a mount housing and a mount member that is configured to releasably attach the heated mirror to a support surface;
a mirror subassembly that is coupled to the mount subassembly, the mirror subassembly including a mirror housing that contains a mirror and a flexible heating element in the form of a flexible heat film that contains heating elements and is secured to a rear surface of the mirror for heating the mirror when the flexible heat film is actuated; and
a battery power source that is operatively connected to a printed circuit board that is contained within the mirror housing;
wherein the mirror housing includes a front part that surrounds a perimeter of the of the mirror and rear part to which the battery power source and the printed circuit board are fixedly coupled, the flexible heat film being disposed between the mirror and the battery power source, the front part being fixedly coupled to the rear part.

21. The mirror of claim 20, wherein the flexible heat film is adhesively bonded to the rear surface of the mirror and wherein the mount subassembly includes a base having an open storage compartment for receiving at least one object.

22. The mirror of claim 20, wherein the base includes at least one guide rail and the mount subassembly further includes a cover that has at least one guide slot that interlocking receives the at least one guide rail, the at least one guide slot being formed on a rear surface of the base, with a front surface of the base including a post that has a ball at a distal free end thereof, the mirror subassembly having a housing that mates with the ball to form a ball-in-socket connection.

23. The mirror of claim 20, further including a ball joint member that has a ball formed at a first end and an elongated stem that terminates in a locking block at an opposite second end, the ball being received within a socket formed along a rear surface of the rear part of the mirror housing and the locking block being configured to be detachably coupled to the mount housing and act as a support for the mirror subassembly when the mirror subassembly is coupled to the ball joint member but not the mount housing.

* * * * *